United States Patent
Wilson

(10) Patent No.: US 9,928,323 B2
(45) Date of Patent: Mar. 27, 2018

(54) METHOD AND SYSTEM FOR FUNCTIONAL VERIFICATION AND POWER ANALYSIS OF CLOCK-GATED INTEGRATED CIRCUITS

(71) Applicant: MICROSEMI SOLUTIONS (U.S.), INC., Aliso Viejo, CA (US)

(72) Inventor: Theodore Wilson, Vancouver (CA)

(73) Assignee: Microsemi Solutions (U.S.), Inc., Aliso Viejo, CA (US)

( * ) Notice: Subject to any disclaimer, the term of this patent is extended or adjusted under 35 U.S.C. 154(b) by 0 days.

(21) Appl. No.: 15/676,676

(22) Filed: Aug. 14, 2017

(65) Prior Publication Data

US 2017/0344682 A1     Nov. 30, 2017

Related U.S. Application Data

(63) Continuation-in-part of application No. 15/583,316, filed on May 1, 2017, which is a continuation of application No. 14/831,505, filed on Aug. 20, 2015, now Pat. No. 9,639,641.

(51) Int. Cl.
*G06F 17/50* (2006.01)

(52) U.S. Cl.
CPC ........ *G06F 17/5031* (2013.01); *G06F 17/505* (2013.01); *G06F 2217/62* (2013.01); *G06F 2217/78* (2013.01); *G06F 2217/84* (2013.01)

(58) Field of Classification Search
CPC ............... G06F 17/5031; G06F 17/505; G06F 2217/84; G06F 2217/62; G06F 2217/78
See application file for complete search history.

(56) References Cited

U.S. PATENT DOCUMENTS

| | | | |
|---|---|---|---|
| 7,523,330 B2 | 4/2009 | Golla et al. | |
| 7,673,201 B1 | 3/2010 | Chan et al. | |
| 7,870,448 B2 | 1/2011 | Konda et al. | |
| 7,908,100 B2 | 3/2011 | Kawabe | |
| 7,958,483 B1 | 6/2011 | Alben et al. | |
| 8,073,669 B2 | 12/2011 | Fernsler et al. | |
| 8,140,925 B2 * | 3/2012 | Bellofatto | G06F 11/2236 713/400 |
| 8,181,134 B2 | 5/2012 | Baumgartner et al. | |

(Continued)

OTHER PUBLICATIONS

Bogliolo, et al., "Regression-Based RTL Power Modeling", ACM Transactions on Design Automation of Electronic Systems, Jul. 2000, vol. 5 (3), pp. 337-372.

(Continued)

*Primary Examiner* — Naum B Levin
(74) *Attorney, Agent, or Firm* — Leber IP Law; Dennis R. Haszko

(57) ABSTRACT

An apparatus for monitoring operation of a design under test (DUT) includes an incoming clock edge input; an outgoing clock edge input; an enable input; a protocol input; an upstream clocking input; and a downstream clocking input. The apparatus also includes a memory in communication with the inputs for storing values from the inputs, and a processor in communication with the memory and the inputs, the processor programmed to determine spurious and missing active clock edges sent from the monitored clock gate. The apparatus also includes a clock categorization output to output the determination of the active clock edges from the monitored clock gate as missing or spurious.

20 Claims, 13 Drawing Sheets

(56) References Cited

U.S. PATENT DOCUMENTS

| | | |
|---|---|---|
| 8,302,043 B2 | 10/2012 | Habermann et al. |
| 8,780,121 B2 | 7/2014 | Chong et al. |
| 8,892,791 B2 * | 11/2014 | McKim, Jr. ..... G01R 31/318594 |
| | | 710/33 |
| 9,639,641 B1 | 5/2017 | Wilson |
| 2006/0005051 A1 | 1/2006 | Golla et al. |
| 2009/0006012 A1 | 1/2009 | Kawabe |
| 2011/0066988 A1 | 3/2011 | Habermann et al. |
| 2013/0064337 A1 | 3/2013 | Hofmann et al. |
| 2016/0004273 A1 | 1/2016 | Chiang et al. |

OTHER PUBLICATIONS

Manovit, et al., "Design and Verification Challenges of ODC-based Clock Gating", PwrLite, Inc., 46th Design Automation Conference, Jul. 26-31, 2009, pp. 1-11.

Mineo, et al., "Save Your Energy: A Fast and Accurate Approach to NoC Power Estimation." Proc. 15th Int'l Symp. High-Performance Computer Architecture, Feb. 2009, pp. 1-8.

U.S. Appl. No. 14/831,505, Notice of Allowance dated Mar. 2, 2017.

U.S. Appl. No. 14/831,505, Office Action dated Dec. 1, 2016.

U.S. Appl. No. 15/583,316, Non-Final Office Action dated Nov. 1, 2017.

* cited by examiner

METHOD AND SYSTEM FOR FUNCTIONAL VERIFICATION AND POWER ANALYSIS OF CLOCK-GATED INTEGRATED CIRCUITS

CROSS REFERENCE

The present application is a continuation-in-part of U.S. patent application Ser. No. 15/583,316 filed May 1, 2017, which is a continuation of U.S. patent application Ser. No. 14/831,505 filed Aug. 20, 2015, now issued as U.S. Pat. No. 9,639,641.

FIELD

The present disclosure relates to analysis of integrated circuit designs.

BACKGROUND

The design of an integrated circuit typically includes, among other aspects, functional verification and power analysis. Functional verification refers to a practice of testing the circuit and analyzing the results of the test to determine whether the circuit is performing to specification. For example, given a set of inputs, does the circuit generate the expected output? Functional verification can be executed with a relatively large degree of automation to cover all of the various operation conditions of the circuit. Briefly, functional verification ensures that the logical design of the circuit is correct.

In contrast, power analysis is an aspect of circuit design that is directed to the physical requirements of the design specification. Therefore, power analysis is generally performed separately from functional verification, and the tools for power analysis are different from the tools for functional verification.

Conventional power analysis can report power consumption of each cell and activity in each net of a design, given a design and netlist activity file. However, these power reports do not indicate whether the power consumption of a cell is correlated to the functional workload of the cell. In practice, a cell may be consuming power but not producing useful work. In this case, conventional power analysis would not indicate whether power consumption could be reduced.

It is desirable to obviate or mitigate these shortcomings of conventional power analysis.

BRIEF DESCRIPTION OF THE DRAWINGS

Embodiments of the present disclosure will now be described, by way of example only, with reference to the attached Figures.

DETAILED DESCRIPTION

Figure 1:
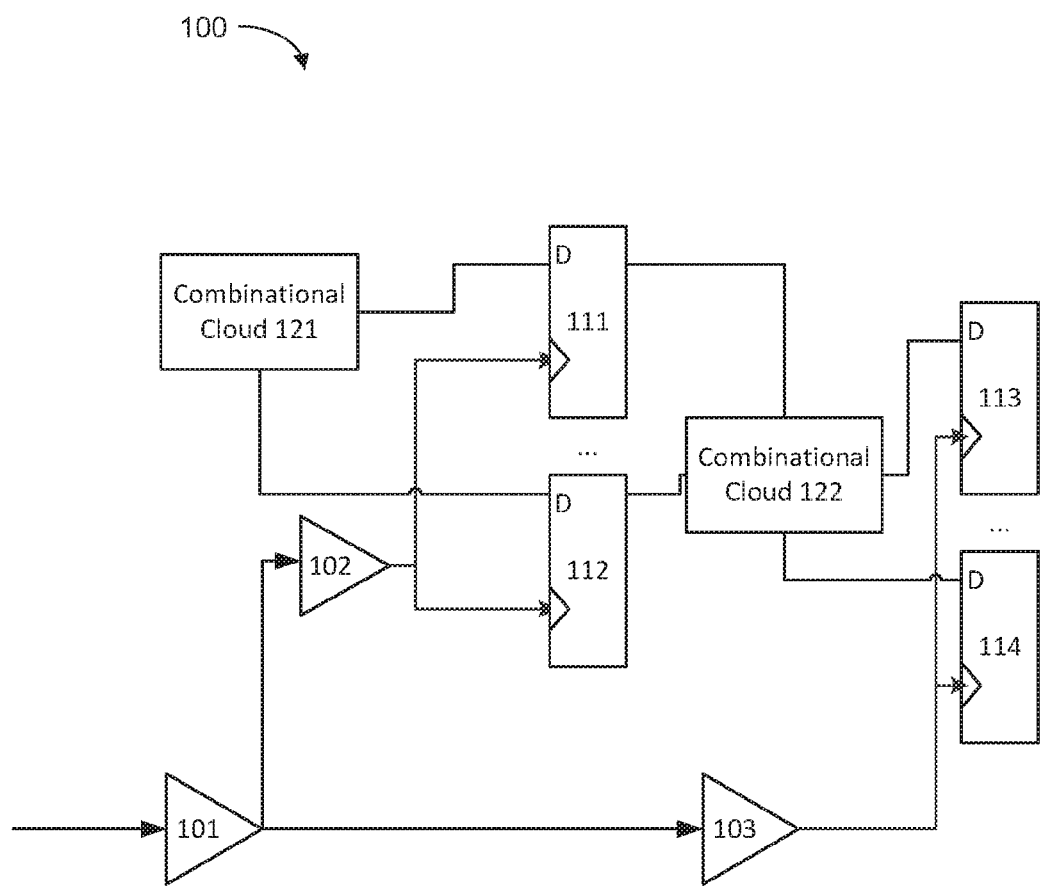
FIG. 1 is an example of a clock-gated circuit for connecting to a clock gate monitor according to an embodiment of the present disclosure.

Generally, the present disclosure provides methods and systems for verifying a clock-gated integrated circuit using tools that perform both functional verification and power analysis on cells of the clock-gated integrated circuit.

An example tool examines the power consumption of cells under a set of functional workloads. Examining power consumption across a set of workloads enables prediction of power consumption under related, but unmeasured, workloads. Thus, by correlating the functional workload to the power consumption, the power analysis performed by this tool may be considered a functional power analysis. The tool can further determine, from the correlation between the functional workload and the power consumption of a cell, whether the power consumption of the cell, or set of cells, may be reduced.

One aspect of the present disclosure provides an apparatus for monitoring operation of a design under test (DUT), the DUT comprising a plurality of combinational logic elements, a plurality of clocked sequential logic elements, and a plurality of clock gate elements connected to selectively provide clock edges to the clocked sequential logic elements. The apparatus comprises a plurality of inputs comprising: an incoming clock edge input connected to detect active clock edges provided to a monitored clock gate of the plurality of clock gate elements of the DUT; an outgoing clock edge input connected to detect active clock edges sent from the monitored clock gate; an enable input connected to detect enable signals provided to the monitored clock gate and any leaf clock gates of the plurality of clock gate elements of the DUT connected to receive clock edges through the monitored clock gate; a protocol input connected to receive protocol signals specifying when the monitored clock gate is required to output active clock edges; an upstream clocking input connected to detect active clock edges output from clock gates controlling sequential logic elements upstream from the sequential logic elements controlled by the monitored clock gate; a downstream clocking input connected to detect active clock edges output to clock gates controlling sequential logic elements downstream from the sequential logic elements controlled by the monitored clock gate. The apparatus comprises a memory in communication with the plurality of inputs for storing values from the plurality of inputs and a processor in communication with the memory and the plurality of inputs, the processor programmed to determine protocol compliance including missing clock edges, to determine spurious active clock edges sent from the monitored clock gate, and to calculate energy consequences of correcting the set of active clock edges delivered by the monitored clock gate. The apparatus comprises a clock categorization output to output the determination of the active clock edges from the monitored clock gate as missing or spurious.

One aspect of the present disclosure provides a method for monitoring operation of a design under test (DUT), the DUT comprising a plurality of combinational logic elements, a plurality of clocked sequential logic elements, and a plurality of clock gate elements connected to selectively provide clock edges to the clocked sequential logic elements. The method comprises detecting active clock edges provided to a monitored clock gate of the plurality of clock gate elements of the DUT, detecting active clock edges sent from the monitored clock gate, detecting enable signals provided to the monitored clock gate and any leaf clock gates of the plurality of clock gate elements of the DUT connected to receive clock edges through the monitored clock gate, receiving protocol signals specifying when the monitored clock gate is required to output active clock edges, detecting active clock edges output from clock gates controlling sequential logic elements upstream from the sequential logic elements controlled by the monitored clock gate, detecting active clock edges output to clock gates controlling sequential logic elements downstream from the sequential logic elements controlled by the monitored clock gate, determining missing clock edges by comparing the active clock edges sent from the monitored clock gate to a set of required edges specified by the protocol signals to determine a missing clock edge at the monitored clock gate, determining spurious active clock edges sent from the monitored clock gate by comparing active clock edges output from clock gates controlling sequential logic elements upstream and active clock edges output to clocks gates controlling sequential logic elements downstream, and outputting an indication of the active clock edges output from the monitor clock gate as missing or spurious.

Other aspects and features of the present disclosure will become apparent to those ordinarily skilled in the art upon review of the following description of specific embodiments in conjunction with the accompanying figures.

FIG. 1 is an example of a clock-gated circuit which can be used to demonstrate the functional power analysis operations of various embodiments of the present disclosure. The circuit 100 comprises a first clock gate 101 connected to a second clock gate 102 and a third clock gate 103. In the illustrated example, clock signals must pass through the first clock gate 101 before reaching the second or third clock gate 102 or 103, and as such the first clock gate 101 may be referred to as a "root", and the second and third clock gates 102 and 103 may each be referred to as a "leaf", of a clock gate "tree".

The second clock gate 102 is connected to each enable input of a first flip-flop 111 and a second flip-flop 112. The third clock gate 103 is connected to each enable input of a third flip-flop 113 and a fourth flip-flop 114. The data inputs of the first and second flip-flops 111 and 112 are triggered by other upstream combinational logic elements (combinational cloud 121) of which the exact nature is unimportant for the purpose of the present disclosure. The data inputs of the third and fourth flip-flops 113 and 114 are triggered by a second combinational cloud 122, which is connected to the outputs of the first and second flip-flops 111 and 112. Thus, the data inputs of the third and fourth flip-flops 113 and 114 are indirectly connected to the outputs of the first and second flip-flops 111 and 112.

In some cases, analyzing and testing a DUT, such as for example, the clock-gated circuit shown in FIG. 1 may be performed by simulating the operation of a DUT utilizing software. In this case, rather than having a DUT comprised of physical hardware elements, the operation of the DUT, including active clock edges passed from clocks gates 101, 102, 103 and data passed between the flip-flops 111, 112, 113, 114 and the combinational logic elements 121, 122, may be simulated using simulation software. Likewise, the clock-gate monitors 200, 300, 500, 900 disclosed below may also be provided through software within the simulated DUT, rather than provided as physical hardware elements, or as a software module arrangement to be run on a DUT simulation. In this sense, in some embodiments reference to inputs, outputs, input nodes, and output nodes are references to physical inputs, outputs, input nodes, and output nodes of physical hardware elements, such as integrated circuit pins. In other embodiments, reference to inputs, outputs, input nodes, and output nodes are not limited to physical inputs, outputs, input nodes, and output nodes of physical hardware elements, but may refer to connections between simulated elements when the DUT is provided as a simulation.

Clock gating is a technique that selectively disables synchronous flip-flops from switching states, which reduces the power consumption of the flip-flops and consequently also power dissipation of combinational cells driven by these flip flops. If the circuit 100 did not have any clock gates, the clock inputs of the flip-flops would be triggered by a common clock, and each flip-flop would switch state on each active clock edge. (As one of skill in the art will appreciate, depending on the design of the circuit in question positive or negative edges may be active clock edges.)

Clock gating selectively passes the clock signal to the clock input of the flip-flop. If a certain flip-flop does not need to change states (to pass the state of data input to the output) then the clock signal can be gated off by the clock gate in order to reduce power consumption in the flip-flop, as well as in the fanout of the flip-flop (e.g., the combinational logic elements receiving data from the flip-flop).

It is difficult to assess the impact of clock gating in the design under representative operation. From a functional verification perspective, the implementation of the clock gating technique in a design should not destroy critical information (as defined by relevant protocols for that design) that would otherwise propagate through the design if clock edges were provided. The destruction of this information would change the required functional behavior of the circuit and would in effect be a violation of relevant protocols (either design specific protocols or industry protocols) applicable to the design.

From a power analysis perspective, clock gating should not provide additional clock edges over what is minimally necessary to move critical information through the design. Otherwise, the dynamic power consumed consequential to delivering these edges is wasted.

Ideally, clock gating should only add minimal complexity to the clock tree-individual clock gates for every flip-flop would not typically save enough power to justify their insertion. It is an optimization problem to find a set of clock gates and enable logic that saves power by reducing clock edges and discarding propagated information at a small incremental cost in added clock gate cells and combinational cells that define the enable logic for each clock gate.

Figure 2:
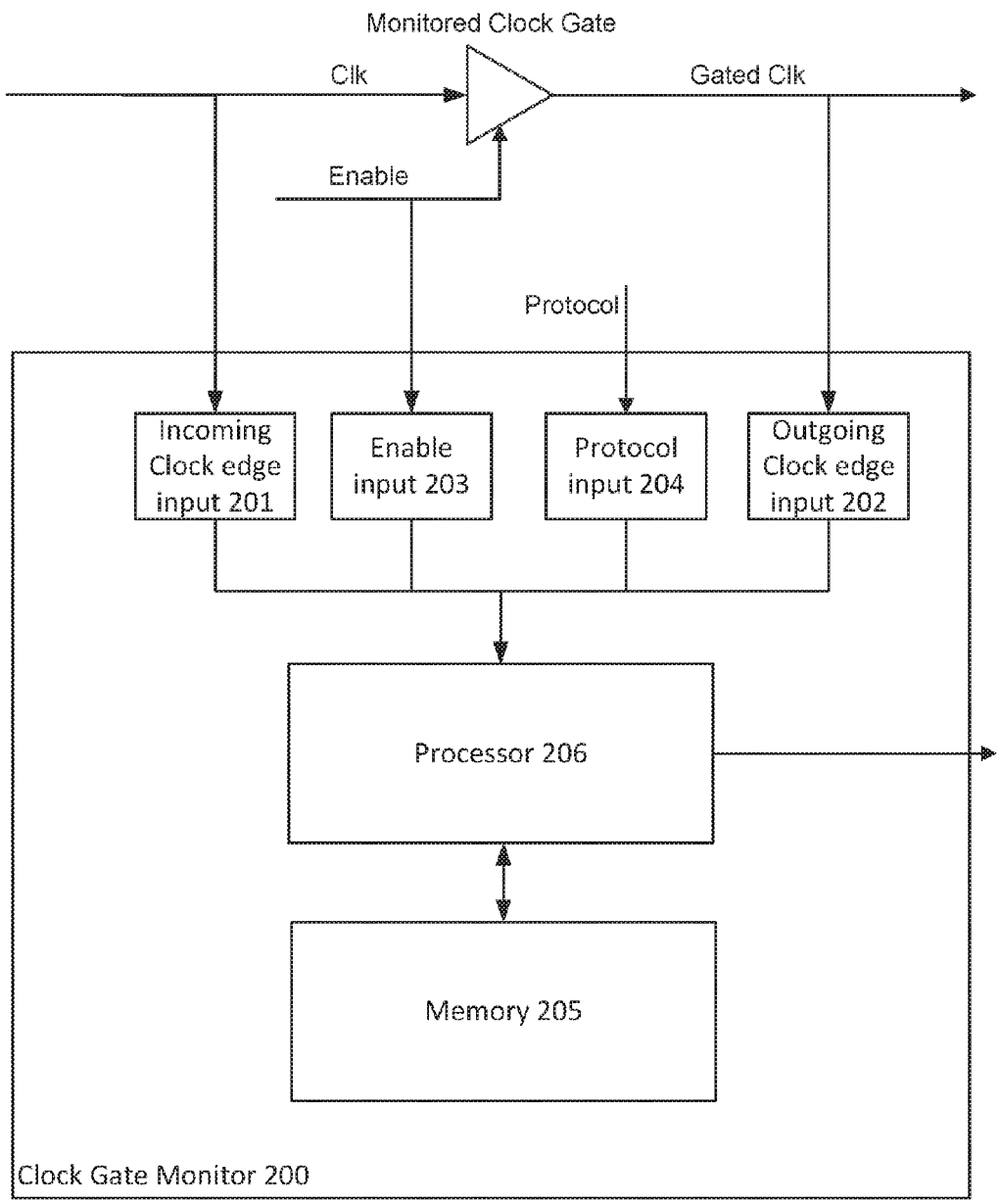
FIG. 2 schematically illustrates an example clock gate monitor for performing functional power analysis according to an embodiment of the present disclosure.

FIG. 2 shows an example clock gate monitor 200 for performing functional power analysis according to an embodiment of the present disclosure. The clock gate monitor 200 can be used to help find the optimal clock gating logic that is protocol compliant yet power efficient.

In an embodiment, the monitor 200 connects to a design under test or device under test (DUT). The DUT comprises a plurality of combinational logic elements (e.g. combinational clouds 121 and 122 of FIG. 1), a plurality of clocked sequential logic elements (e.g. flip-flops 111, 112, 113, and 114 of FIG. 1), and a plurality of clock gate elements (e.g. clock gates 101, 102 and 103 of FIG. 1) connected to selectively provide clock edges to the clocked sequential logic elements.

In a typical implementation, a DUT would be provided with a plurality of clock gate monitors 200, with one clock gate monitor 200 connected to each clock gate of the DUT. In some implementations, additional clock gate monitors 200 may be connected to the clock gate input of each un-clock-gated flip-flop in the DUT (i.e., at locations where additional clock gates could be added to the DUT), for example in order to assist in evaluation of whether or not to add additional clock gates. As indicated above, clock gate monitor 200 may be provided through software within the simulated DUT, or a software module being run on the simulated DUT, without limitation.

The monitor 200 comprises a plurality of inputs, comprising: an incoming clock edge input 201, an outgoing clock edge input 202, an enable input 203, and a protocol input 204. The monitor 200 also comprises a memory 205; and a processor 206.

The incoming clock edge input 201 is connected to the DUT to detect active clock edges provided to a monitored clock gate.

The outgoing clock edge input 202 is connected to the DUT to detect active clock edges sent from the monitored clock gate.

The enable input 203 is connected to the DUT to detect enable signals provided to the monitored clock gate and any leaf clock gate connected to receive clock edges through the monitored clock gate.

The protocol input 204 is connected to the DUT to receive protocol signals specifying when the monitored clock gate is required to output active clock edges. A protocol signal active edge is preferably provided prior to the delivery time of each required output active clock edge.

In some embodiments, the protocol input 204 comprises two bits and when either bit is high a required output active clock edge is indicated. With such a configuration, a continuous series of required output active clock edges can be represented in the protocol input as {[0,1], [1,0], [0,1], [1,0], . . . }.

The memory 205 is in communication with the plurality of inputs 201-204 and stores values from the plurality of inputs.

The processor 206 is in communication with the memory 205 and the plurality of inputs 201-204. The processor 206 is programmed to determine protocol compliance and to calculate energy consequences of dropping of active clock edges at a monitored clock gate.

The monitor 200 provides dynamic analysis of a clock gate to allow confirmation that, cycle to cycle, the clock gate is well coordinated with other clock gates and conforms to relevant protocols. Monitor 200 provides advantages over conventional static analysis techniques, which are only based on toggle counts per net over a time interval, not cycle to cycle behavior of the design.

Figure 3:
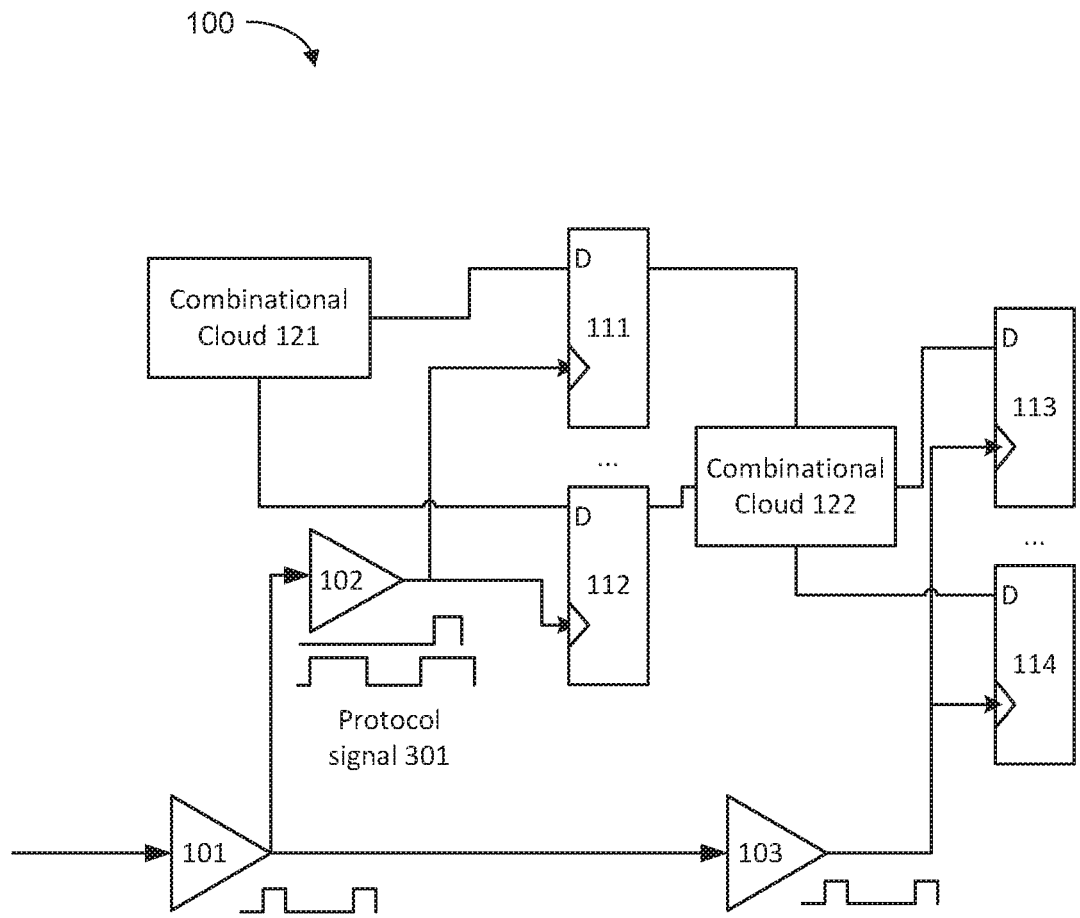
FIG. 3 is an example of a clock-gated circuit for connecting to a clock gate monitor according to an embodiment of the present disclosure.

FIG. 3 shows an example of using a monitor (not shown), such as the monitor 200, to determine a protocol violation. For example, the flip-flop 111 may be part of the write address slave AXI interface of a design. This flip-flop 111 must follow protocol defined for a slave on the AXI write address channel, governed by AWVALID and AWREADY. The behavior of AWVALID and AWREADY define when this sequential cell must receive a clock edge to capture the attributes of the AXI write address. The clock gate 102 for the flip-flop 111 inherits the requirements for the specific flip-flop.

The monitor connected to the clock gate 102 will determine whether the clock gate 102 violates the AXI protocol. In the example shown in FIG. 3, an incoming clock edge input (not shown), similar to the incoming clock edge input 201 of the clock gate monitor 200, receives the input of the clock gate 102 (which is the output of clock gate 101), an outgoing clock edge input (not shown), similar to the outgoing clock edge input 202 of the clock gate monitor 200, receives the output of clock gate 102, an enable input (not shown), similar to the enable input 203 of the clock gate monitor 200, receives the enable single input to clock gate 102, and a protocol input (not shown), similar to the protocol input 204 of the clock gate monitor 200, receives the protocol signal 301.

A processor (not shown), similar to the processor 206 of the clock gate monitor 200, determines, from the information provided by the outgoing clock edge input and the protocol input, that a protocol violation occurred. In particular, in the example of FIG. 3, the protocol signal 301 indicates that two edges should be output from the clock gate 102, but only one edge is actually output as indicated by the signal above protocol signal 301 in FIG. 3.

Figure 4:
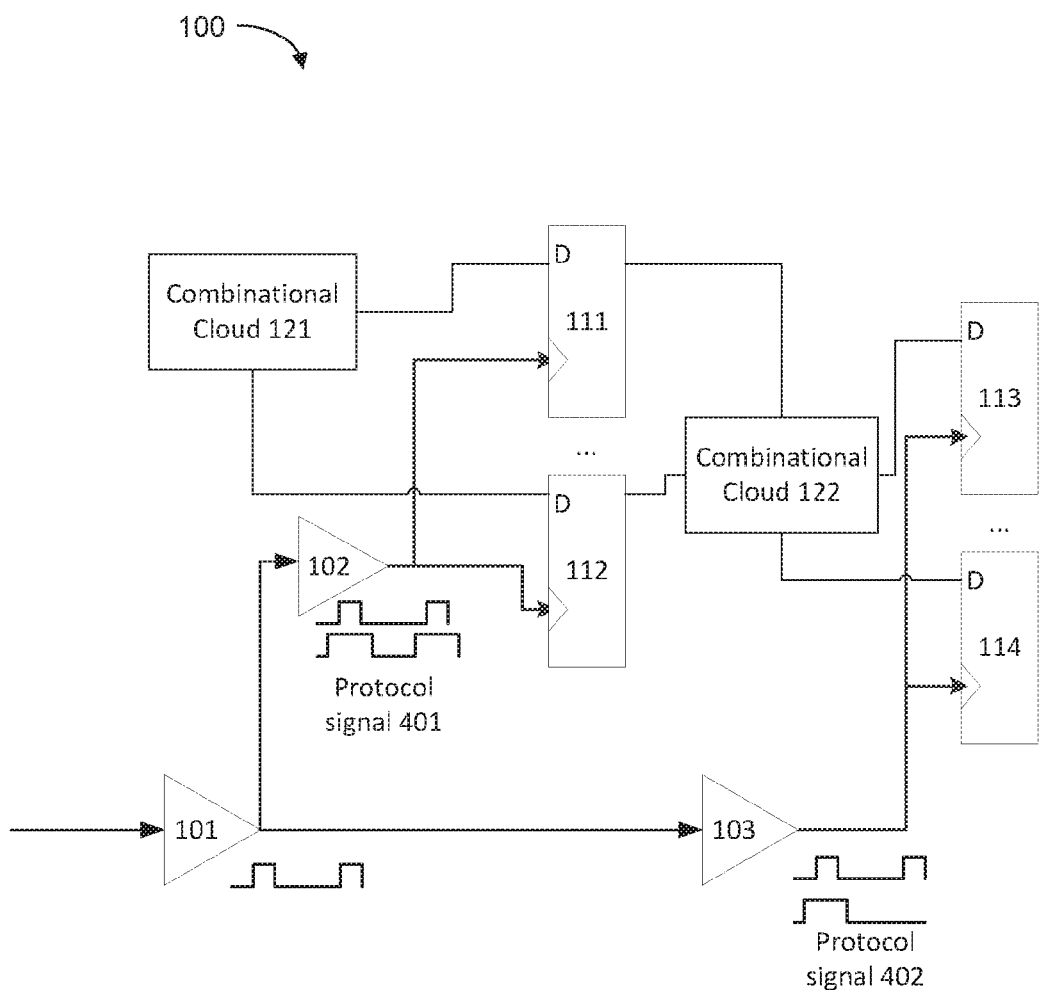
FIG. 4 is an example of a clock-gated circuit for connecting to a clock gate monitor according to an embodiment of the present disclosure.

FIG. 4 shows an example of using a monitor (not shown), such as the clock gate monitor 200, to determine a protocol spurious clock edge. For example, the AXI protocol requires that flip-flops 111 and 112 receive two clock edges, as indicated by protocol signal 401. The AXI protocol requires that flip-flops 113 and 114 receive one clock edge, as indicated by protocol signal 402. Consequently, the monitor can determine that clock gate 103 is outputting an additional unrequired or "spurious" clock signal that is not correlated to the AXI protocol. Consequently, the flip-flops 113 and 114 are consuming more power than necessary given protocol.

A processor (not shown), similar to the processor 206 of the clock gate monitor 200, can also calculate how much energy is saved by dropping a clock edge at the monitored clock gate. The processor calculates the savings by comparing and incoming clock edge input (not shown), similar to the incoming clock edge input 201 of the clock gate monitor 200, to an outgoing clock edge input (not shown), similar to the outgoing clock edge input 202 of the clock gate monitor 200. For example, when the incoming clock edge input has two edges and the outgoing clock edge input has one edge the difference between the incoming clock edge input and the outgoing clock edge input shows a single clock edge energy savings credited to the monitored clock gate. In the case where the monitored clock gate has one or more leaf clock gates further downstream in its clock gate tree, the processor can also attribute additional energy savings to the monitored clock gate for dropping an edge when an enable input (not shown), similar to the enable input 203 of the clock gate monitor 200, indicates that such leaf clock gates are enabled, such that but for dropping of the edge at the monitored clock gate that edge would have also propagated to the leaf clock gates, and the monitored clock gate is credited with saving the energy that would have been consumed by the leaf clock gates and their fanouts.

Figure 5:
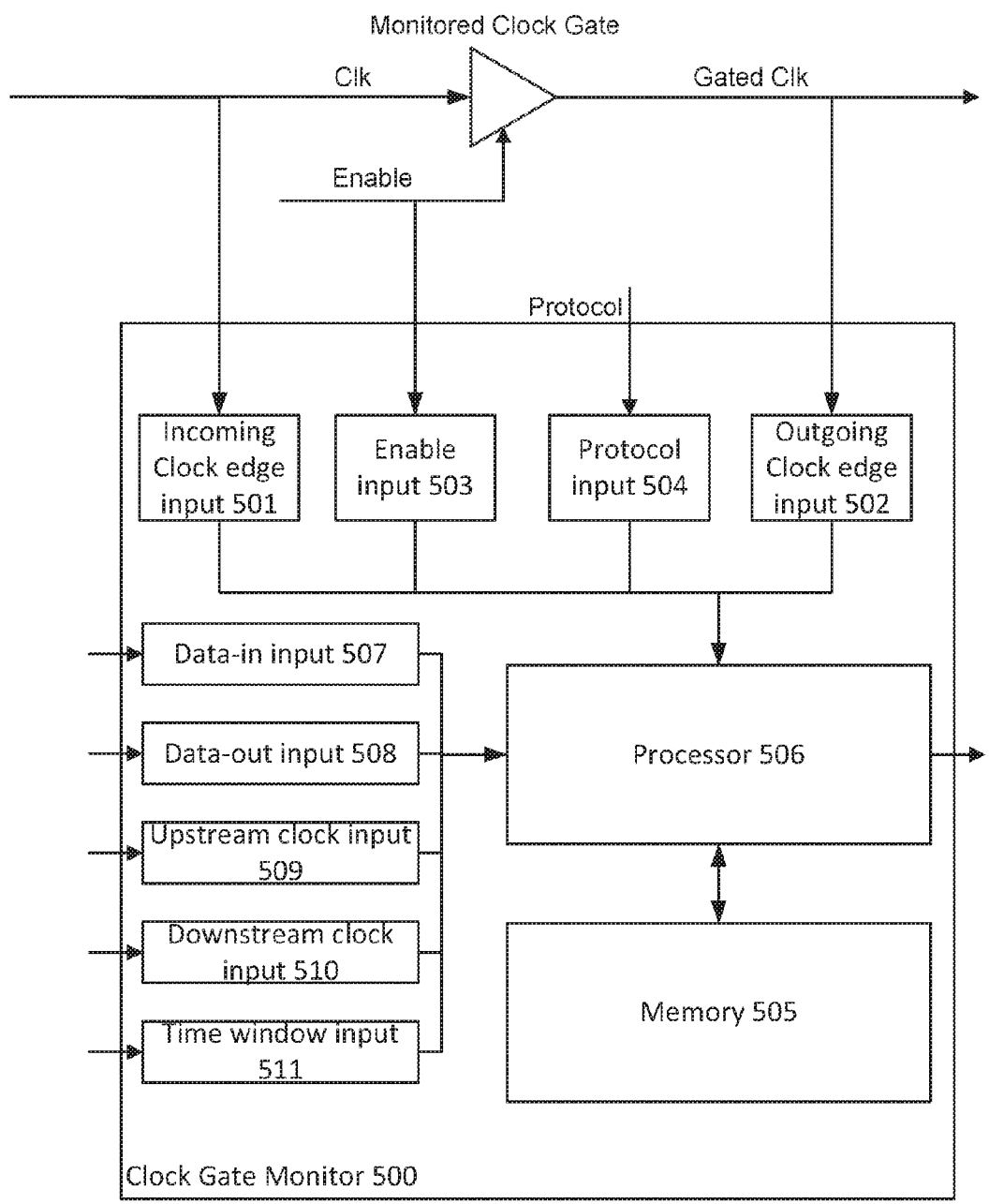
FIG. 5 schematically illustrates another example clock gate monitor for performing functional power analysis according to an embodiment of the present disclosure.

FIG. 5 shows a clock gate monitor 500 according to a further embodiment of the present disclosure. The clock gate monitor 500 can be used to help find the optimal clock gating logic that is protocol compliant yet power efficient.

The monitor 500 connects to a design under test or device under test (DUT). The DUT comprises a plurality of combinational logic elements (e.g. combinational clouds 121 and 122), a plurality of clocked sequential logic elements (e.g. flip-flops 111, 112, 113, and 114), and a plurality of clock gate elements (clock gates 101 and 102) connected to selectively provide clock edges to the clocked sequential logic elements.

In a typical implementation, a DUT would be provided with a plurality of clock gate monitors 500, with one clock gate monitor 500 connected to each clock gate of the DUT. In some implementations, additional clock gate monitors 500 may be connected to the clock gate input of sets of un-clock-gated flip-flop in the DUT (i.e., at locations where additional clock gates could be added to the DUT), for example in order to assist in evaluation of whether or not to add additional clock gates.

The monitor 500 comprises a plurality of inputs, comprising: an incoming clock edge input 501, an outgoing clock edge input 502, an enable input 503, a protocol input 504, a data-in input 507, a data-out input 508, an upstream clocking input 509, a downstream clocking input 510, and a time window input 511. The monitor 500 also comprises a memory 505 and a processor 506.

The incoming clock edge input 501 is connected to the DUT to detect active clock edges provided to a monitored clock gate.

The outgoing clock edge input 502 is connected to the DUT to detect active clock edges sent from the monitored clock gate.

The enable input 503 is connected to the DUT to detect enable signals provided to the monitored clock gate and any leaf clock gate connected to receive clock edges through the monitored clock gate.

The protocol input 504 is connected to the DUT to receive protocol signals specifying when the monitored clock gate is required to output active clock edges. A protocol signal is preferably provided just prior to the time each required for outputting each active clock edge. In some embodiments, the protocol input 504 comprises two bits as described above with reference to FIG. 2.

The memory 505 is in communication with the plurality of inputs and stores values from the plurality of inputs.

The processor 506 is in communication with the memory and the plurality of inputs. The processor is programmed to determine protocol compliance and to calculate power consequences of clock gating.

The data-in input 507 is connected to detect signals on data input nodes (D-nodes) of sequential logic elements within a fanout of the monitored clock gate. The fanout of the monitored clock gate comprises all of the clocked sequential elements connected to receive clock signals through the monitored clock gate.

The data-out input 508 is connected to detect signals on data output nodes (Q-nodes) of sequential logic elements within the fanout of the monitored clock gate.

The upstream clocking input 509 is connected to detect active clock edges output from the clock gates controlling the sequential logic elements upstream from the sequential logic elements controlled by the monitored clock gate.

The downstream clocking input 510 is connected to detect active clock edges output from the clock gates controlling the sequential logic elements downstream from the sequential logic elements controlled by the monitored clock gate.

The time window input 511 receives a time window range instructing the processor 506 to perform certain operations for that time window range. The time window range may, for example, be a fixed or adjustable number of clock cycles. In an embodiment, the processor 506 determines power saving based on the energy saved due to dropping of active clock edges at the monitored clock gate for the time window. In another embodiment, the processor 506 determines power saving based on energy saved due to dropping of active clock edges at the monitored clock gate, and energy saved in the fanout of the monitored clock gate, for the time window. In yet another embodiment, the processor 506 determines power savings based on energy saved due to dropping of active clock edges at the monitored clock gate, energy saved in the fanout of the monitored clock gate, and also determines potential additional power savings realizable through elimination of the unnecessary active clock edges for the time window. In yet another embodiment, the processor 506 determines power savings based on energy saved due to dropping of active clock edges at the monitored clock gate, energy saved in the fanout of the monitored clock gate, potential additional power savings realizable through elimination of the unnecessary active clock edges for the time window. In yet another embodiment, the processor 506 determines power savings based on energy saved due to dropping of active clock edges at the monitored clock gate, energy saved in the fanout of the monitored clock gate, potential additional power savings realizable through elimination of the unnecessary active clock edges for the time window, and also determines additional power savings realizable through elimination of unnecessary combinational activity.

The monitor 500 provides the ability to determine if clock gates for flip-flops upstream and downstream of each other are well coordinated so that required information propagates with a minimum number of clock edges. The active clock edges that the clock gate needs to output to propagate this required information are referred to as "required" active clock edges. Required active clock edges may be determined based on the protocol signals received by the monitor, as well as the activity occurring upstream and downstream from the clock gate. Protocol violations and compliance, spurious clock edges, actual energy/power savings due to clock gating and potential additional energy/power savings may be determined by the monitor 500 in substantially the same manner as described above with respect to the monitor 200 of FIG. 2. Energy consumption in the fanout of the monitored clock gate may be determined, for example, based on the data-in and data-out inputs 507 and 508 which indicate the set of sequential elements in the fanout that change output values in response to a clock edge.

Figure 6:
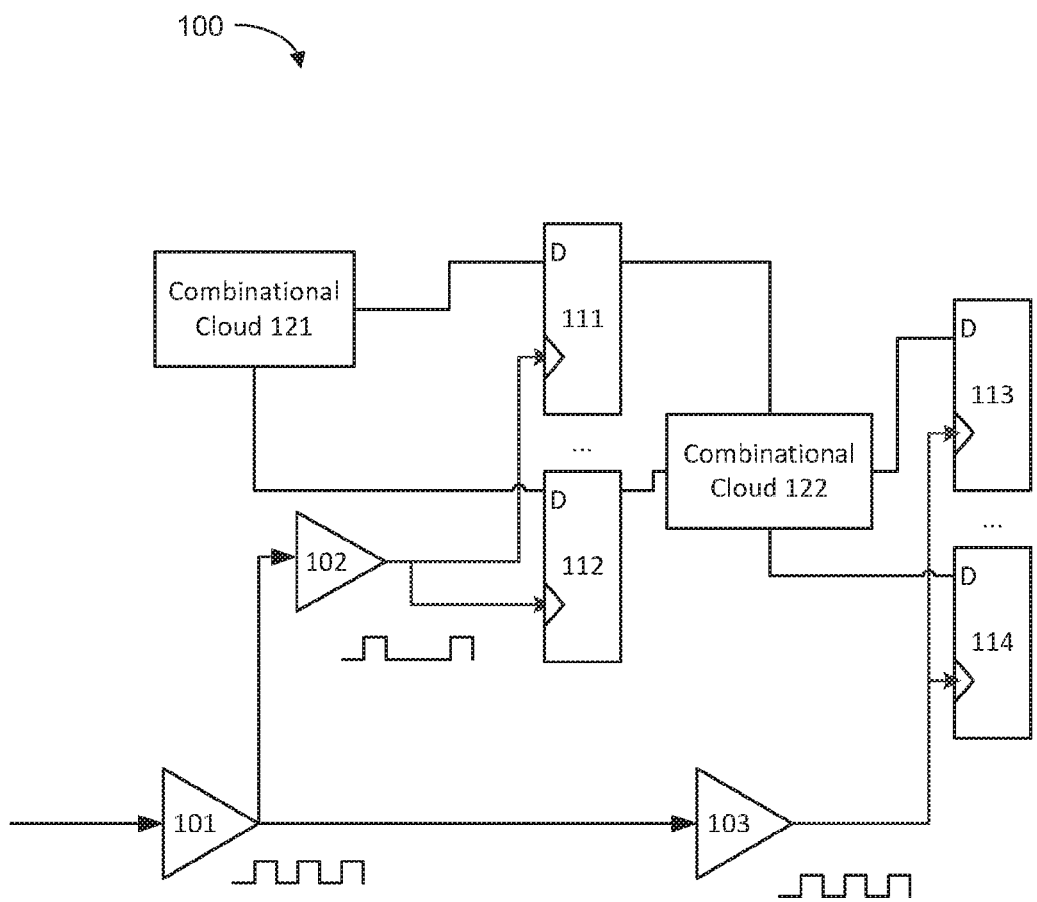
FIG. 6 is an example of a clock-gated circuit for connecting to a clock gate monitor according to an embodiment of the present disclosure.

FIG. 6 shows an example of using the monitor 500 to determine coordination of upstream and downstream clock edges. For example, the clock gate 101 propagates an edge, while the clock gate 102 drops the edge. The clock gate 103, however, propagates the same edge that was dropped by clock gate 102, but clock gate 103 has a fanout that is located downstream of the fanout of clock gate 102. Downstream means that the fanout of the clock gate 103 (the clocked sequential logic elements connected to receive clock edges through clock gate 103) receives data from the fanout of the clock gate 102.

In this case, the monitor 500 is connected to the clock gate 103 and the processor 506 compares the upstream clock input 509 and the outgoing clock edge input 502 and determines that the upstream clock gate 102 dropped an edge and no new information will be propagated to the fanout of the clock gate 103 for that edge. Therefore, the processor will determine that the clock gate 103 could have dropped the edge that was dropped by clock gate 102, such that additional energy/power savings could be realized.

Figure 7:
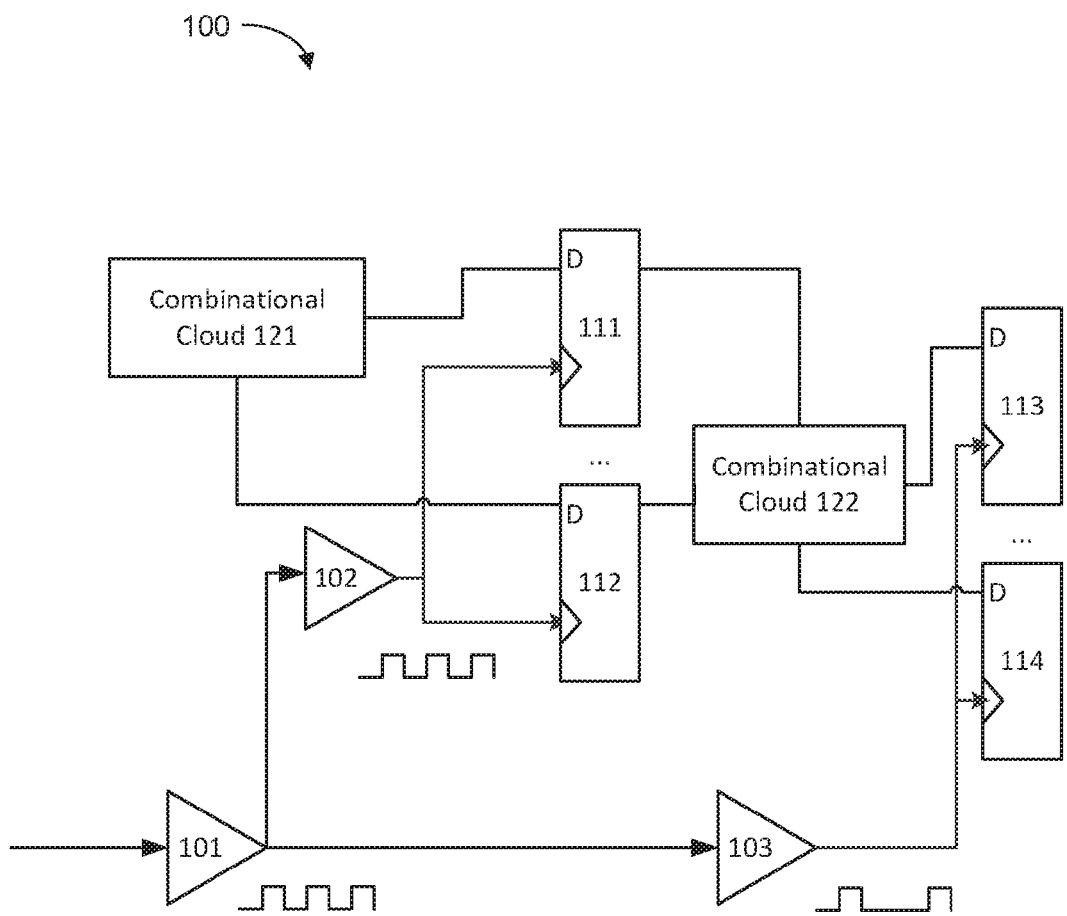
FIG. 7 is an example of a clock-gated circuit for connecting to a clock gate monitor according to an embodiment of the present disclosure.

FIG. 7 shows another example of using the monitor 500 to determine coordination of upstream and downstream clock edges. For example, the clock gate 101 propagates an edge, while the clock gate 103 drops the edge. The clock gate 102, however, propagates the same edge but has a fanout that is located upstream of the fanout of clock gate 103. Upstream means that the fanout of the clock gate 102 (the clocked sequential logic elements connected to clock gate 103) are providing data to the fanout of the clock gate 103.

In this case, the monitor 500 is connected to the clock gate 102 and the processor 506 will compare the downstream clock input 510 and the outgoing clock edge input 502 and determine that the downstream clock gate 103 dropped an edge and the information propagated by the fanout of clock gate 102 to the fanout of the clock gate 103 for that edge will simply be discarded. Therefore, the processor will determine that the clock gate 102 could have dropped the edge that was dropped by clock gate 103, such that additional energy/power savings could be realized.

In some embodiments, one or more clock gate monitors (such as monitor 200 or 500 described above or 900 described below) may have inputs implemented on nodes or pins. As described above, the nodes may be physical nodes on a physical device, such as a chip, or may be implemented within a simulation of the DUT without physical devices, or as a test program being run on the same processor which simulates the DUT. The following table describes the nodes of an example clock gate monitor, with reference to corresponding inputs of monitors 200/500 described above and monitor 900 described below where applicable:

TABLE 1

| Node | Width | Purpose/Notes |
|---|---|---|
| ECK | 1 | Provides an ability to attribute all past activity to a net power savings or power loss, and check compliance to protocol. (Corresponds to outgoing clock edge input 202/502/902.) |
| D_NODES | R bits determined by total sequential cell input nodes. | Together with CK, provides an ability to sample values at the inputs of sequential fanout that may not propagate to the outputs of the sequential fanout because of clock gating (CK moved but not ECK), thereby attributing the reduction in power to the clock gate behavior. (Corresponds to data-in input 507/907.) |
| Q_NODES | Q bits determined by total sequential cell output nodes. | Provides an ability to observe activity at the outputs of sequential fanout that did stimulate the combinational fanout, which in turn provides the ability to attribute all dynamic power in the design to the behavior of individual clock gates. Without Q NODES it is not possible to accurately model combinational power consumption nor power dissipated internal to sequential cells. (Corresponds to data-out input 508/908.) |
| U_ECK | N bits, one bit per upstream clock gate that propagates information to the sequential fanout of the monitored clock gate. | Provides an ability to observe whether or not previous to this ECK active edge at least 1 upstream clock gate provided a clock edge to its own fanout, thereby propagating information that could be captured by this clock gate. Lacking at least 1 upstream clock gate ECK active edge, there is no new information for this clock gate ECK to capture. (Corresponds to upstream clocking input 509/909.) |
| D_ECK | P bits, one bit per downstream clock gate that propagates information from the monitored clock gate. | Provides an ability to observe whether or not after this ECK active edge at least 1 downstream clock gate provided a clock edge to its own fanout, thereby capturing information propagated by this clock gate. Lacking at least 1 downstream clock gate ECK active edge, the information propagated by this clock gate has been discarded and hence the ECK edge produced wasted power. (Corresponds to downstream clocking input 510/910.) |
| MUST_ECK | 2 | Provides an ability to observe whether or not this ECK edge is required by protocol. The count of past MUST_ECK active edges is either equal to 0 (protocol spurious) 1 (protocol required) >1 (some protocol required edges were not delivered). One of a pair of bits transitions low-high ahead of the CK active edge to indicate that protocol requires an ECK active edge before the end of the current clock cycle. Two bits are used so that an OR indicates times when clocks should be provided by the clock gate. Two bits are used so that back to back clock edges can produce positive edges on WINDOW near inactive edges of CK, and ahead of the active edge of CK. (Corresponds to protocol input 204/504/904.) |

TABLE 1-continued

| Node | Width | Purpose/Notes |
|---|---|---|
| CK | 1 | Provides an ability to count the number of input clock active edges dropped before ECK has an active edge. For leaf clock gates in particular this ensures they are not credited with dropping edges that were dropped by root clock gates because ECK didn't toggle because CK input didn't toggle either.<br>(Corresponds to incoming clock edge input 201/501/901.) |
| E | S bits, one bit per fanout leaf clock gate in the fanout of the monitored clock gate. | Provides an ability to credit a root clock gate with power savings in leaf clock gates when CK does not propagate to ECK because specific leaf clock gates have their enable node active.<br>(Corresponds to enable input 203/503/903.) |
| WINDOW | 1, both edges active. | Typical practice is to define static time windows in which power is computed for the activity in the design. In contrast, WINDOW allows the clock gate to track the power consequence of each node toggle as they occur. WINDOW can be arbitrarily set to the clock period itself or to the duration of a packet passing through the design and similar. The WINDOW node exposes the time-accuracy of the monitor so that a user can see power dissipated in each packet etc. This flexibility means that unlike current practice it is not necessary for a user to, for example, work backwards from reported power consumed between 100 and 120 nanoseconds to specific clock cycles nor specific design specific events.<br>Ultimately the clock gate monitor is still a digital, event driven, apparatus. It cannot look within a single clock cycle and determine that there is high power dissipation because the clock wave form is very crisp, with a lot of high frequency components. But within limitations of digital event-based modelling the clock gate monitor can be made arbitrarily time accurate.<br>(Corresponds to time window input 511/911.) |

In some embodiments, the clock gate monitor assesses all dropped and propagated clock edges for power impact. The power impact of a dropped or propagated clock edge is defined as the dynamic power consumed (or saved) by the clock gate, the sequential fanout of the clock gate, and the combinational fanout of the sequential fanout of the clock gate consequential to the propagated (or dropped) clock edge.

In some embodiments, the clock gate monitor also assesses all enable toggles for power impact. The power impact of an enable toggle may be defined as the dynamic power dissipated in the clock gate and combinational cloud that solely provides the clock gate enable signal consequential to the enable toggle. The word solely here allows a clock gate monitor to, in extreme cases, attribute very small power consequence to enable toggles when that enable is generated by a combinational cloud that drives other design cells than the clock gate alone.

By assessing the output clock edges and enable toggles for total power impact, a set of clock gate monitors, one per clock gate in the design, is able to assess dynamic power consumption in the entire design on the basis firstly of enable toggles and output clock edges. In such a full design assessment, ungated sequential cells may be provided with a set of virtual clock gates that pass all clock edges.

To increase the accuracy of the power consequences attributed to the clock gate, in some embodiments the D (input) and Q (output) nodes of the sequential fanout of each clock gate are also monitored. These additional inputs allow the specific power consequence within each sequential cell of propagation of D (input) edges to Q (output) edges to be assessed, as well as the specific power consequence of Q (output) edges on the combinational fanout.

The total dynamic power impact of dropped or propagated clock edges, and in aggregate the entire design, may be defined as either required or wasted on the basis of: protocol requirements; the previous active clock edges of upstream clock gates; the subsequent active clock edges of downstream clock gates; the current enable state of fanout clock gates; and, activity at D (input) and Q (output) nodes of fanout sequential cells.

The power consequence of the clock gate may be assessed as follows:

1. For all clock gates:
   a) A missing protocol-required output active clock edge is defined as missing required power. This indicates that the design does not meet requirements. A dropped output active clock edge is defined as saving power otherwise.
   b) An additional output active clock edge that is not required by protocol is defined as producing wasted power.
   c) All other output active clock edges are defined as producing required power unless the previous behavior of upstream clock gates dictates otherwise.

2. For a clock gate with upstream clock gates:
   a) An output active clock edge without at least one previous upstream active clock edge is defined as wasted power as it is not possible for this output active clock edge to capture any new information propagated by an upstream active clock edge.
   b) All other output active clock edges are defined as producing required power unless the subsequent behavior of downstream clock gates dictates otherwise.

3. For a clock gate with downstream clock gates:
   a) An output active clock edge without at least one subsequent downstream active clock edge is defined as wasted power as it is not possible that any information propagated by this clock gate was captured by downstream sequential elements.

b) All other output active clock edges are defined as producing required power.

4. For a root clock gate with leaf clock gates that drops an output clock edge:

a) The power consequence of this dropped output active edge is increased for each leaf clock gate with an asserted enable signal. The root clock gate is credited with larger power impact for each leaf clock gate that would otherwise have propagated the clock edge.

The power consequence of the clock gate behavior is increased as follows:

1. For all dropped active clock edges, the power consequence of the dropped active edge is increased by: the set of D input toggles that are not propagated to Q toggles (power which would have been dissipated by sequential fanout); and, the set of Q toggles that do not excite the combinational cloud (power which would have been dissipated by combinational fanout).

2. For all propagated active clock edges, the power consequence of the propagated active edge is increased by: the set of D input toggles that are propagated to Q toggles (internal power dissipated by sequential fanout); and, the set of Q toggle that do excite the combinational cloud (power dissipated by combinational fanout).

In some embodiments, the activity of the monitored clock gate is viewed by the clock gate monitor as a sequence of transactions. Each transaction is defined by a single output active edge of the clock gate. All activity of the clock gate and cells grouped with the clock gate is associated with specific output active edges of the clock gate in a manner that indicates the net positive (negative) impact of the clock gate on device power. A set of transactions may be grouped together within a window defined by a time window input as discussed above.

In some embodiments, a clock gate monitor maintains statistics for each of a total window, a previous transaction, and a current transaction. Such statistics may, for example, be determined by incrementing various counters for the window, previous transaction and current transaction, as discussed further below. The total window statistics indicate the energy consumed and saved by the clock gate is accumulated in a period that spans all ECK transactions completed within a power window defined by WINDOW node edges. The previous transaction statistics are maintained because some node activity is only possible due to an ECK active edge and occurs after the ECK edge. Consequently, this activity can only be recorded for the previous ECK transaction when the current ECK active edge is observed. The current transaction statistics may be used to track node activity that is not due to an ECK active edge, and as such may be recorded for the current ECK transaction.

As an extension to basic functionality, if a clock gate monitor is observing netlist activity with functional timing and many non-zero transition delays, then ECK edges may be used to define delays at which point nodes are examined for activity.

In some embodiments, a clock gate monitor retains a set of 3 statistics only (i.e., window, previous transaction and current transaction), replacing content as events occur. In some embodiments, statistics could be forwarded or copied to an external agent or memory prior to replacing content.

The following table illustrates examples of how node activity is mapped to transactions in some embodiments:

TABLE 2

| Node | Transaction | Notes |
| --- | --- | --- |
| ECK | Definition of Boundaries | Each active edge of ECK defines a new transaction, completes the previous transaction. |
| D_NODES | Current | Toggles on D nodes are sampled on ECK active edges and recorded for the current transaction. Some or none of these toggles will later propagate to Q node toggles. |
| Q_NODES | Previous | Toggles on Q nodes occur after ECK active edges and are recorded for the previous transaction. |
| U_ECK | Current | Output active edges from upstream clock gates must have occurred prior to the output active edge of this clock gate otherwise the current output active edge is spurious--not possibly capturing new information. |
| D_ECK | Previous | Active edges of downstream clock gates must occur after the previous output active edge of this clock gate and before the current output active edge of this clock gate otherwise the previous output active edge is spurious-information was discarded by downstream clock gates. |
| MUST_ECK | Current | Prior to the current output active edge, protocol monitors have either provided 1, none, or more than 1 MUST_ECK positive edge indicating that the current output active edge is either required, spurious, or insufficient with regards to protocol. |
| CK | Current | Additional CK active edges prior to the output active edge of the clock gate are claimed as saved energy for the current transaction. |
| E | Current | Any enable edges prior to the output active edge are claimed for the current transaction to provide indication of when the enable node is toggling too frequently to allow the clock gate to save any net energy. |
| WINDOW | Total Window | Edges of the window node define the end of the total window, triggering computation of energy to power followed by clearing all statistics for the next window. |

Figure 8:
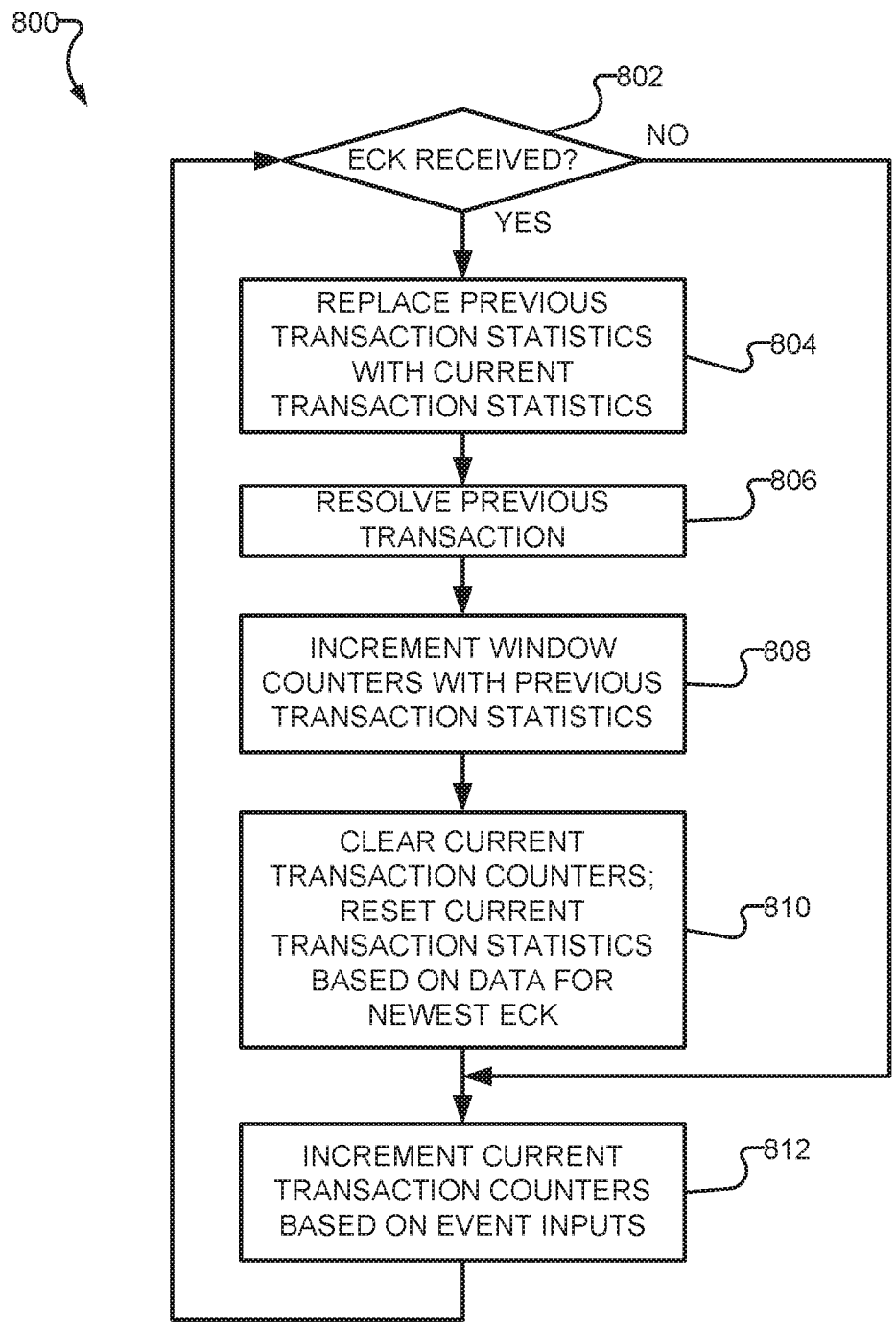
FIG. 8 is a flowchart illustrating an example method of processing inputs received at a clock gate monitor according to an embodiment of the present disclosure.

FIG. 8 is a flowchart showing an example method 800 carried out by a clock gate monitor according to one embodiment. Throughout method 800, the clock gate monitor monitors the outgoing clock edge input for an active clock edge at 802. When an outgoing active clock edge is detected (block 802 YES output), the previous transaction statistics are replaced with the current transaction statistics at 804, and the consequences of the previous transaction are resolved at 806. After the previous transaction has been resolved, counters for the total window are incremented based on the previous transaction statistics at 808.

Incrementing counters for the total window may, for example, involve any or all of the following counters:

Protocol_spurious_fJ: incremented if the last ECK edge is spurious with respect to protocol.

Protocol_ck_edges_lost_fJ: incremented if missing protocol required clock cycles were detected.

No_receiver_fJ: incremented if no downstream clock gate accepted data from last ECK edge.

No_transmitter_fJ: incremented if no upstream clock gate sent data for capture by last ECK edge.

Q_edges_saved_fJ: incremented by difference between observed D edges and Q edges across fanout for last ECK edge using fJ_PER_Q_EDGE[k] for Q bit k, all k.

Combo_edges_saved_fJ: incremented by difference between observed D edges and Q edges across fanout for last ECK edge.

ECK_edges_saved_fJ: incremented across fanout clock gates for all edges that otherwise would have been delivered to their fanout.

E_fJ: incremented for each E (enable) edge between the last active ECK edge and the previous active ECK edge.

Total_fJ, power consumed by the cluster of cells grouped with the clock gate: incremented by:
  Q edges*(fJ_PER_D_TO_Q_EDGE+fJ_PER_Q_EDGE)
  +fJ_PER_ECK_EDGE[0]
  +total_leakage_fJ, (leakage is calculated based on time as known in the art)

Net_fJ, negative representing net energy savings: leakage_fj+E_fj−q_edges_saved_fj eck_edgs_saved_fj−fanout_saved_fJ−combo_saved_fJ.

At 810, the current transaction counters are cleared and the current transaction statistics are reset based on the most recent outgoing active clock edge detected. Resetting the current transaction statistics at 810 may, for example, involve: recording the total CK active edges dropped prior to the current ECK active edge (this contributes to power savings by this clock gate); recording total ECK active edges not transmitted to leaf clock gates when they were otherwise enabled (this contributes to power savings by this clock gate); recording total E edges prior to the new ECK edge (this contributes to power cost of this clock gate); and/or, if protocol applies, recording the number of protocol required ECK active edges prior to the current ECK active edge (this determines if the current edge is required by protocol and whether previous required edges were not delivered).

At 812, counters for the current transaction are incremented based on events at the inputs of the clock gate monitor. Incrementing the current transaction counters at 812 continues as long as no new outgoing active clock edge is detected (block 802 NO output). When a new outgoing active clock edge is detected (block 802 YES output), the method 800 returns to 804 and continues as discussed above.

Figure 9:
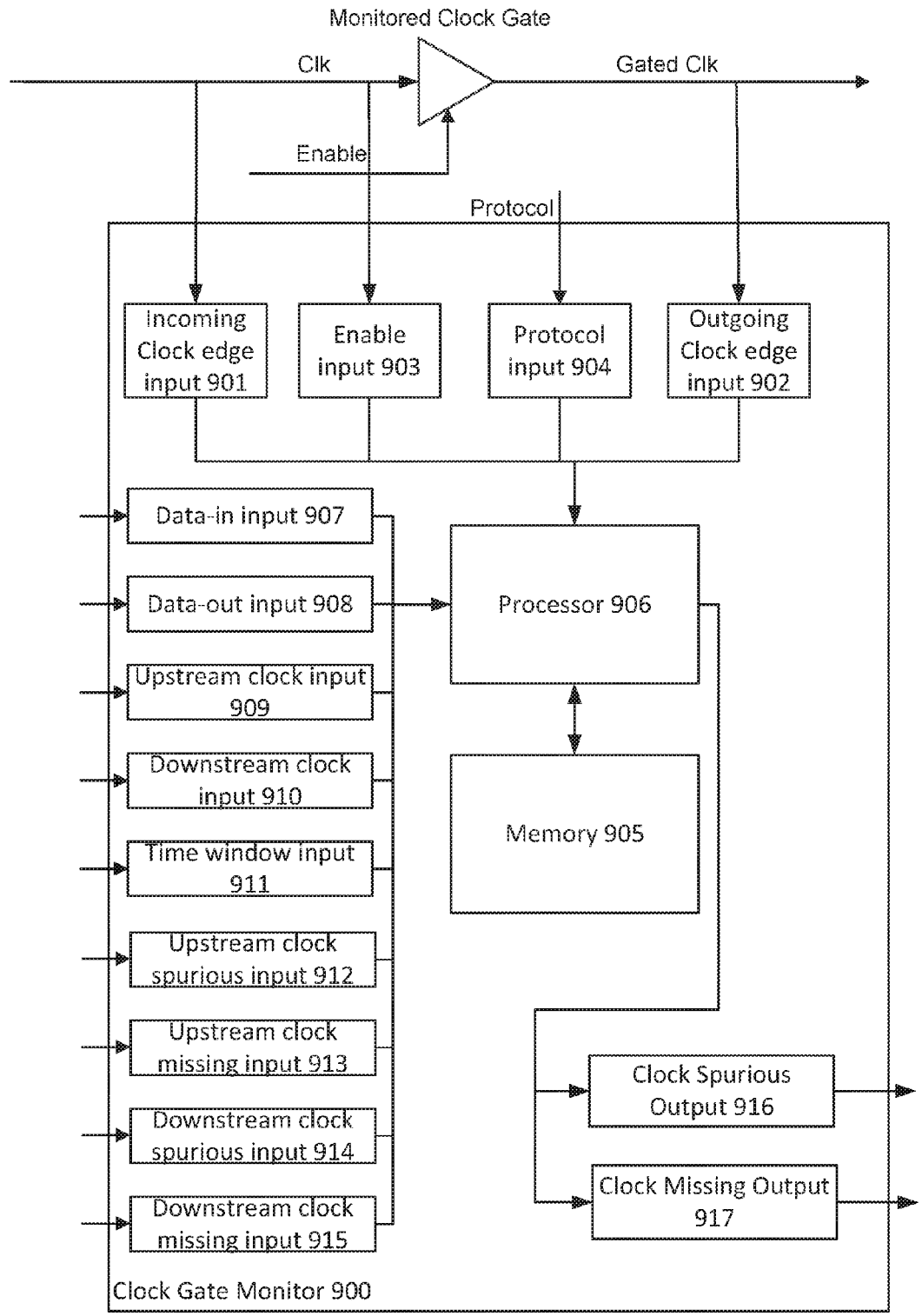
FIG. 9 shows a clock gate monitor according to a further embodiment of the present disclosure.

FIG. 9 shows a clock gate monitor 900 according to a further embodiment of the present disclosure. As described in more detail below, the clock gate monitor 900 receives information from upstream and downstream monitors indicated whether clock edges output from those monitors are missing or spurious. This additional information can be used to help better find the optimal clock gating logic that is protocol compliant yet power efficient compared to, for example, monitor 500.

For example, if a first clock gate monitored by a first monitor, similar to monitor 500, outputs an active clock edge and the first monitor receives a signal on its D_ECK node that a second clock gate downstream from the first clock gate subsequently output an active clock edge, then the first monitor determine that the active edge was required because it appears to the first monitor that the data was received by the second clock gate. However, if the second monitor determines that the subsequent active clock edge was in fact spurious, this information could be utilized by the first monitor to determine that the active clock edge was also spurious. Thus, by having monitors communicate information regarding determined clock edge categorizations, such as missing or spurious, to upstream and downstream monitors, additional power savings may be realized compared to DUTs in which the previously described monitors 500 are utilized.

The monitor 900 connects to a DUT, either physically, or logically as described above, similar to monitor 500. The DUT may comprise a plurality of combinational logic elements (e.g. combinational clouds 121 and 122), a plurality of clocked sequential logic elements (e.g. flip-flops 111, 112, 113, and 114), and a plurality of clock gate elements (clock gates 101 and 102) connected to selectively provide clock edges to the clocked sequential logic elements, as shown in FIG. 1.

In a typical implementation, a DUT would be provided with a plurality of clock gate monitors 900, with one clock gate monitor 900 connected to each clock gate of the DUT. In some implementations, additional clock gate monitors 900 may be connected to the clock gate input of sets of un-clock-gated flip-flop in the DUT (i.e., at locations where additional clock gates could be added to the DUT), for example in order to assist in evaluation of whether or not to add additional clock gates.

The monitor 900 comprises a plurality of inputs, comprising: an incoming clock edge input 901, an outgoing clock edge input 902, an enable input 903, a protocol input 904, a data-in input 907, a data-out input 908, an upstream clocking input 909, a downstream clocking input 910, and a time window input 911. The monitor 900 also comprises a memory 905 and a processor 906. These inputs 901, 902, 903, 904, 907, 908, 909, 910, 911 are substantially similar to the incoming clock edge input 501, the outgoing clock edge input 502, the enable input 503, the protocol input 504, the data-in input 507, the data-out input 508, the upstream clocking input 509, the downstream clocking input 510, and the time window input 511 of the monitor 500 described above, and therefore are not further described to avoid repetition. Similarly, the memory 905 and the processor 906 are substantially similar to the memory 505 and the processor 906 of the monitor 500 described above, and therefore these elements are not further described here to avoid repetition.

The monitor 900 also includes additional inputs as compared to monitor 500 shown in FIG. 5: an upstream clock spurious input 912, an upstream clock missing input 913, a downstream clock spurious input 914, and a downstream clock missing input 915. The monitor 900 also includes outputs: clock spurious output 916 and clock missing output 917.

The clock spurious output 916 is asserted when the processor 906 determines that an active clock edge output by the monitored clock gate is spurious. The clock spurious output 916 provides information to the other monitors of the DUT that the active clock edge output by the clock gate being monitored by the monitor 900 is spurious.

The clock missing output 917 is asserted when the processor determines or detects that the protocol input 504 and the incoming clock edge input 501 are both asserted but that the outgoing clock edge input 901 is not asserted, indicating a missing clock edge from the clock gate monitored by the monitor 900.

respectively, to upstream clock spurious input and upstream clock missing input of the monitor downstream of the monitor 900 and, respectively, to the downstream clock spurious input and the downstream clock missing input of the monitor upstream of the monitor 900.

In addition to the nodes utilized to implement inputs as described above in Table 1, the additional inputs and outputs of monitor 900 may be implemented on nodes as described in the following table:

TABLE 3

| Node | Width | Purpose/Notes |
| --- | --- | --- |
| SPURIOUS_OUT | 1 | Output node that indicates the current output clock edge of the monitored clock gate as spurious (Corresponds to clock spurious output 916.) |
| MISSING_OUT | 1 | Output node that indicates an additional clock edge of the monitored clock gate is missing, i.e., required by protocol but not present in the OUT (Corresponds to clock missing output 917.) |
| U_SPURIOUS | N bits, one bit per upstream clock gate that propagates information to the sequential fanout of the monitored clock gate. | Input that provides an indication from upstream monitors that specific upstream clock edges are spurious (Corresponds to upstream clock spurious input 912) |
| U_MISSING | N bits, one bit per downstream clock gate that propagates information to the sequential fanout of the monitored clock gate. | Input that provides an indication from upstream monitors that one active clock edge that is protocol required is missing from a specific upstream clock gate (Corresponds to upstream clock missing input 913.) |
| D_SPURIOUS | P bits, one bit per downstream clock gate that propagates information from the monitored clock gate. | Input that provides an indication from downstream monitors that specific downstream clock edges are spurious (Corresponds to upstream clock spurious input 914) |
| D_MISSING | P bits, one bit per downstream clock gate that propagates information from the monitored clock gate. | Input that provides an indication from downstream monitors that one active clock edge that is protocol required is missing from a specific downstream clock gate (Corresponds to upstream clock missing input 915.) |

The upstream clock spurious input 912 and the upstream clock missing input 913 are connected, respectively, to a clock spurious output and a clock missing output of a monitor (not shown) upstream of the monitor 900 to receive indications from the upstream monitor that a clock edge from the upstream clock gate are spurious, or if a clock edge is missing from the upstream clock gate.

The downstream clock spurious input 914 and the downstream clock missing input 915 are connected, respectively, to a clock spurious output and a clock missing output of a monitor (not shown) downstream of the monitor 900 to receive indications from the downstream monitor that a clock edge from a downstream clock gate are spurious or if a clock edge is missing from the downstream clock gate.

Similarly, the clock spurious output 916 and the clock missing output 917 of the monitor 900 are connected, In addition to Table 2 above, the additional nodes of the monitor 900 may be monitored to transactions as set forth in the following table:

TABLE 4

| Node | Transaction | Notes |
| --- | --- | --- |
| SPURIOUS_OUT | Current | Outputs to upstream and downstream monitors an indication that the output active clock edge is determined spurious. |
| MISSING_OUT | Current | Outputs to upstream and downstream monitors an indication that a protocol active clock edge is missing. |

TABLE 4-continued

| Node | Transaction | Notes |
| --- | --- | --- |
| U_SPURIOUS | Current | Provides indication that a received active clock edge from an upstream clock gate has been determined as spurious. |
| U_MISSING | Current | Provides indication that a protocol required active clock edge from an upstream clock gate was missed. |
| D_SPURIOUS | Previous | Provides indication that an active clock edge output from an downstream clock gate has been determined as spurious. |
| D_MISSING | Previous | Provides indication that a protocol required active clock edge from a downstream clock gate was missed. |

In this way, the monitors 900 of the DUT are able to communication additional information with each other in order that each monitor may determine the full set of no transmitter and no receiver cases within the DUT when determining the statistics at step 808 of the method illustrated in FIG. 8 and described previously.

For example, utilizing the monitor 900, the counters No_receiver_fJ and No_transmitter_fJ, described above, may be modified to be incremented as follows:

No_receiver_fJ: incremented if and only if the following sum, determined for each downstream clock gate, is not positive for any downstream clock: count of active edges received on downstream clock input 909+count of active edges on downstream clock missing input 915–count of active edges on downstream clock spurious input 914. In other words, the count of active edges on downstream clock spurious input 914 is greater than or equal to the sum of the count of active edges received on downstream clock input 909 and the count of active edges on downstream clock missing input 915.

No_transmitter_fJ: incremented if and only if the following sum, determined for each upstream clock gate, is not positive for any upstream clock gate: a count of active edges on the upstream clock input 910+count of active edges on the upstream clock missing input 913–a count of active edges on the upstream clock spurious input 912.

Referring back to the examples illustrated in FIGS. 3, 4, 6, and 7, a monitor 900 utilized to monitor clock gate 102 in the example shown in FIG. 3 would assert clock missing output 916 indicating that the monitor 900 has determined a missing clock edge, as described above with reference to FIG. 3.

In addition, the information received by a monitor 900 may be utilized to refine the determinations of spurious, missing, or required active clock edges compared to monitor 500. For example, if in the example described above with reference to FIG. 3, a first monitor, similar to monitor 900, monitoring downstream clock gate 103 signaled to a second monitor, also similar to monitor 900, that monitors clock gate 102 that the first active clock edge output by clock gate 103 was spurious, then the second monitor 900 may utilize this information to determine that no clock edge is missing from clock gate 102, contrary to the determination described previously. The reason is that, in this case, data passed by a clock edge apparently missing at clock gate 102, according to the protocol, would not be received by downstream elements 113, 114 when the spurious clock edge determined for clock gate 103 in this example is removed. Therefore, rather than determining that a clock edge is missing at clock gate 102, the additional information from the first monitor that monitors clock gate 103 may be utilized by the second monitor to determine a protocol error at clock gate 102.

In the previously described example shown in FIG. 4, a monitor, similar to monitor 900, utilized to monitor the clock gate 103 would assert clock spurious output 917 indicating that the monitor 900 has determined that a clock edge output by the clock gate 103 is determined to be spurious as described above with reference to FIG. 4. In this case, monitors, similar to monitor 900, monitoring clock gates 101 and 102 could utilize the information it receives from the monitor of clock gate 103 that the clock edge is spurious to determine spurious clock edges at clock gates 101 and 102, realizing additional power savings compared to the previously described examples utilizing monitors 500.

A monitor, similar to monitor 900, utilized to monitor clock gate 103 in the example shown in FIG. 6 would assert the clock spurious output 917 when the monitor determines the spurious clock edge output by the clock gate 103, as described above with reference to FIG. 6. This information may be utilized by a monitor, similar to monitor 900, utilized to monitor clock 101 to determine an additional spurious clock edge output by clock gate 101. However, if for example a monitor, similar to monitor 900, monitoring clock gate 102 determined a missing clock edge and asserting clock missing output, this information could be utilized by the monitor of clock gate 103 to determine that the clock edge is, in fact, not spurious, thus refining the determination that would be made utilizing monitors 500.

A monitor, similar to monitor 900, utilized to monitor clock 102 in the example shown in FIG. 7 would assert the clock spurious output 917 when the monitor 900 determines the spurious clock edge output by the clock gate 102, as described above with reference to FIG. 7. This information may be utilized by a monitor, similar to monitor 900, monitoring clock gate 101 to determine that clock gate 101 is also outputting a spurious clock edge. However, if for example, a monitor monitoring clock gate 103 determines that a clock gate is missing, then clock missing output would be asserted, and this information would be utilized by monitors of clock gates 101 and 102 to determine that, in fact, the clock edges that would otherwise have been determined to be spurious are required.

As described above, the monitor 900 may categorize power consumed by the design as required, missing or spurious, with these quantities being computed for each output edge of the monitored clock gate and reflecting the total power consumed by the clock gate and its fanout. In this portion, a clock gate and its associated fanout, as described previously, may be referred to as a cell group (CG). Therefore, each monitor determines the power consumed by the CG associated with the monitored clock gate in order to pass data through the CG for each output active clock edge. The output clock edge of each clock gate and the associated power can be viewed as a power transaction.

In addition to categorizing power consumed, in some embodiments the processor 906 of the monitor 900 may be programmed to pass power transactions between monitors as data flows through the DUT from CG to CG. In this way, power consumed by the CG is mapped to data moving through the CG. As described in more detail below, a monitor receives power transaction information from upstream monitors for the data that is input into the CG. The monitor may add to the power transaction information the power consumed by the CG associated with the monitor in order to pass the power through that CG. In this way, for each portion of data that is output by the DUT, the accumulated power consumed by each CG of the DUT as the data moves through the DUT is recorded as power transaction information. This power transaction information may be utilized, for example, to compare the power requirements of different DUTs that perform equivalent operations to optimize efficiency in the design.

Figure 10A:
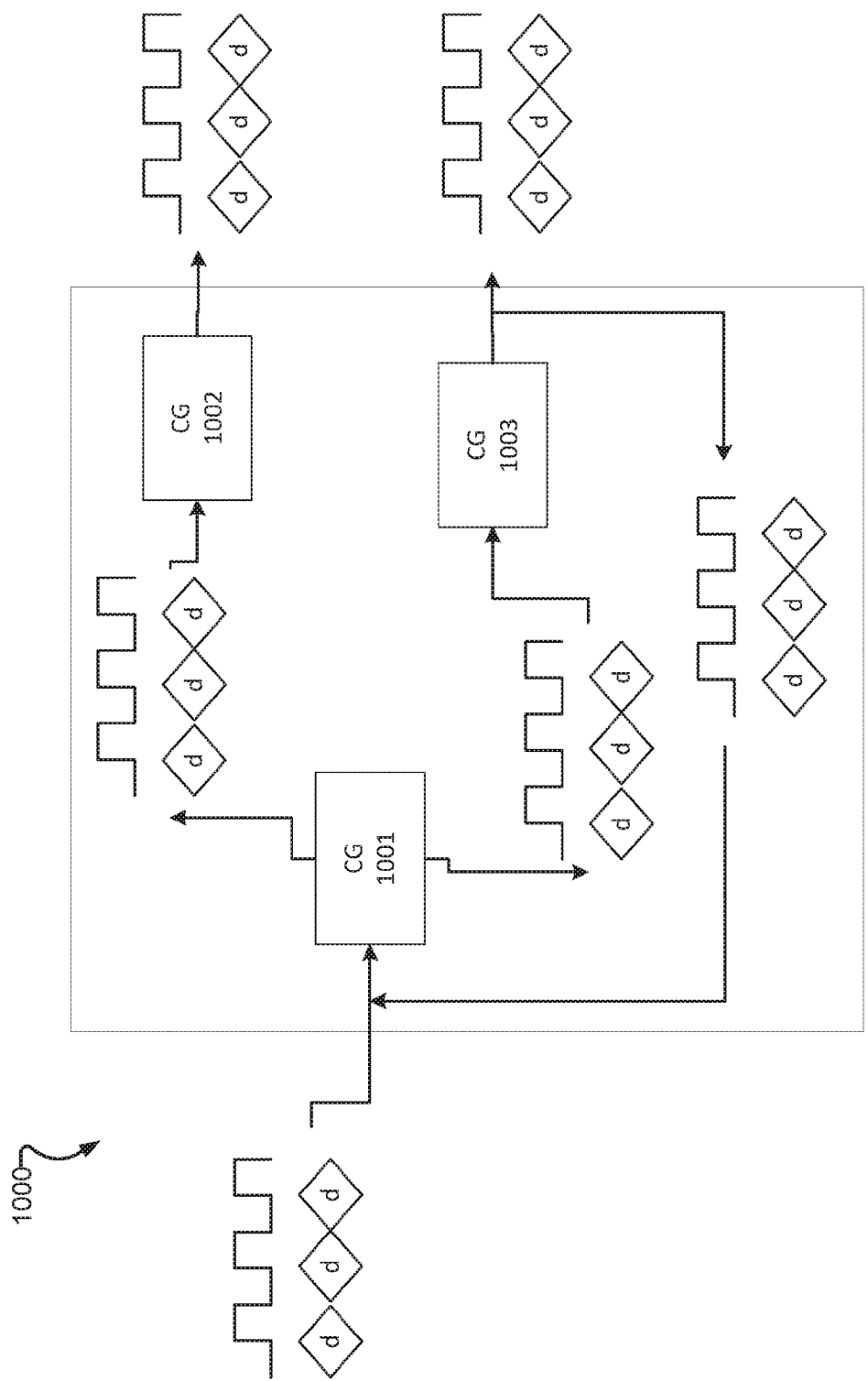
FIG. 10A illustrates a circuit which may include similar elements as the circuit previously described with reference to FIG. 1.

FIG. 10A illustrates a circuit 1000, which may include similar elements as circuit 100 previously described with reference to FIG. 1. The circuit 1000 includes a first CG 1001, a second CG 1002, and a third CG 1003 that correspond, respectively, to the clock gates 101, 102, and 103 and their respective associated fanouts. Data, represented by the diamonds, are pass between the CGs of the circuit 100 and propagate through the DUT. In the example circuit 1000 shown in FIG. 10A, data output from the third CG 1003 is input back into the first CG 1001.

For example, in the circuit 1000 shown in FIG. 10A the first CG 1001 includes clock gate 101, second CG 1002 includes the clock gate 102, the first flip-flop 111 and the second flip-flop 112, the first combination cloud 121 and the second combination cloud 122, and the third CG 1003 includes the third clock gate 103, the third flip-flop 113 and the fourth flip-flop 114.

Figure 10B:
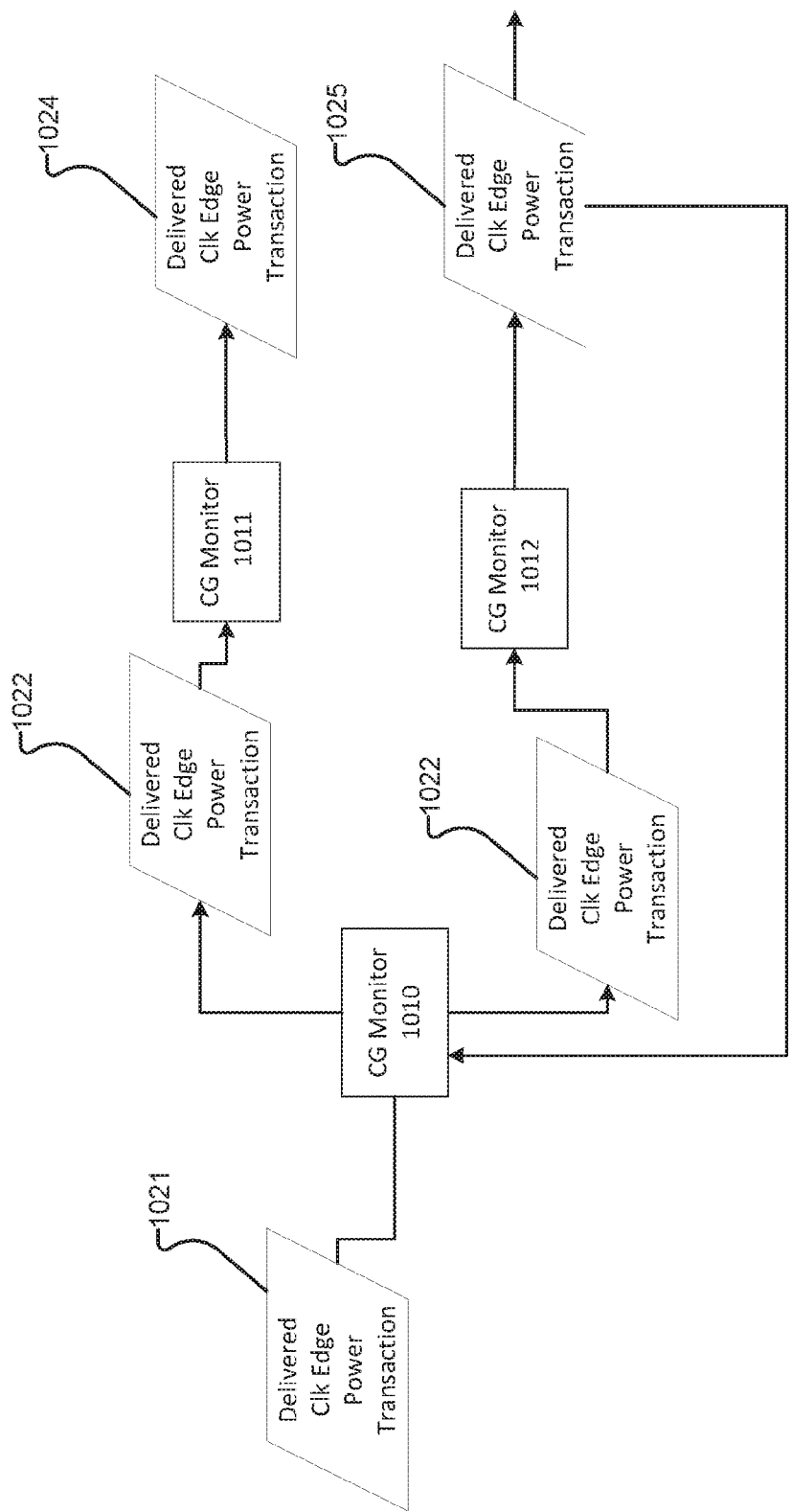
FIG. 10B shows connections between monitors and clock gates according to an embodiment of the present disclosure.

In order to pass power transaction statistics between monitors 900, the monitor 900 include an additional input (not shown in FIG. 9) for receiving power transaction statistics from upstream monitors and an additional output (not shown in FIG. 9) for outputting power transaction statistics to downstream monitors. FIG. 10B shows the monitors 1010, 1011, and 1012 that are connected, respectively, to the clock gates 1001, 1002, 1003 shown in FIG. 10A. As data is passed from a first CG to a second CG downstream from the first CG, the monitor associated with the first CG passes power transaction statistics associated with that data to the monitor associated with the second CG.

For example, FIG. 10B shows that data entering the DUT has associated power transaction statistics 1021 that are received by the monitor 1010 associated with CG 1001 shown in FIG. 10A. As data passes from CG 1001 to CG 1002 and CG 1003, as shown in FIG. 10A, monitor 1010 passes power transaction statistics 1022 to each of monitor 1011 and 1012. The monitor 1011 outputs power transaction statistics 1024 and the monitor 1012 outputs power transaction statistics 1025, which is passed back to monitor 1010.

The input power transaction statistics 1021 may be the total power consumed in circuits upstream of circuit 1000 that are not part of the present DUT, but may be part of the overall circuit of the device of which circuit 1000 is a part. In this way, a complete circuit may be broken down into blocks that may be simulated and analyzed separately, where each block has as input the data and the associated power transaction statistics 1021 that are expected from previous parts of the circuit.

As described above, the power transaction statistics output by a monitor includes the power consumed within CG associated with that monitor. As described in more detail below, the power transaction statistics output by a particular monitor may include a total power consumed by the DUT in order to pass the data through the DUT including through the CG associated with that monitor. The total power is calculated based on the power transaction statistics that the monitor receives from an upstream monitor and the calculated power statistics that the monitor calculates for the power to pass through the CG associated with that monitor. In this way, each monitor updates and passes on the power transaction statistics as data flows through the DUT. In addition, as described in more detail below with reference to FIG. 12, the power transaction statistics may include the contributions to the total power from each of the upstream CGs through which the data has passed.

In some embodiments, a CG that has a fanout to N other CGs, such as CG 1001 shown in the example in FIG. 10A, which delivers data to CG 1002 and to CG 1003, may divide the power transaction statistics between the fanout CGs such that the power that is accrued in those CGs is some fraction, e.g., 1/N, of the total power consumed is accrued by each of the N fanout CGs. For example, the power transaction statistics 1022 that monitor 1010 for CG 1001 passes to monitor 1011 and monitor 1012 may each be half of the total power consumed by the DUT for delivering the through CG 1001, such that the total power determined by each of CG 1002 and CG 1003 will accrue the power from upstream CGs at half of the total power. In other embodiments, the power is not split evenly between the fanout CGs.

In embodiments in which a CG includes a memory element, such as a RAM chip, that is driven by a clock gate, the power transaction statistics that are generated and forwarded by the clock gate monitors may be utilized to track and report the total power associated with data written in each addressable location of the memory. In this case, the power associated with data written to the memory that is overwritten by new data before the previous data was read is assigned to the power transaction statistics of the new data in order to reflect the cost of unnecessary writing of data to the memory.

Figure 11:
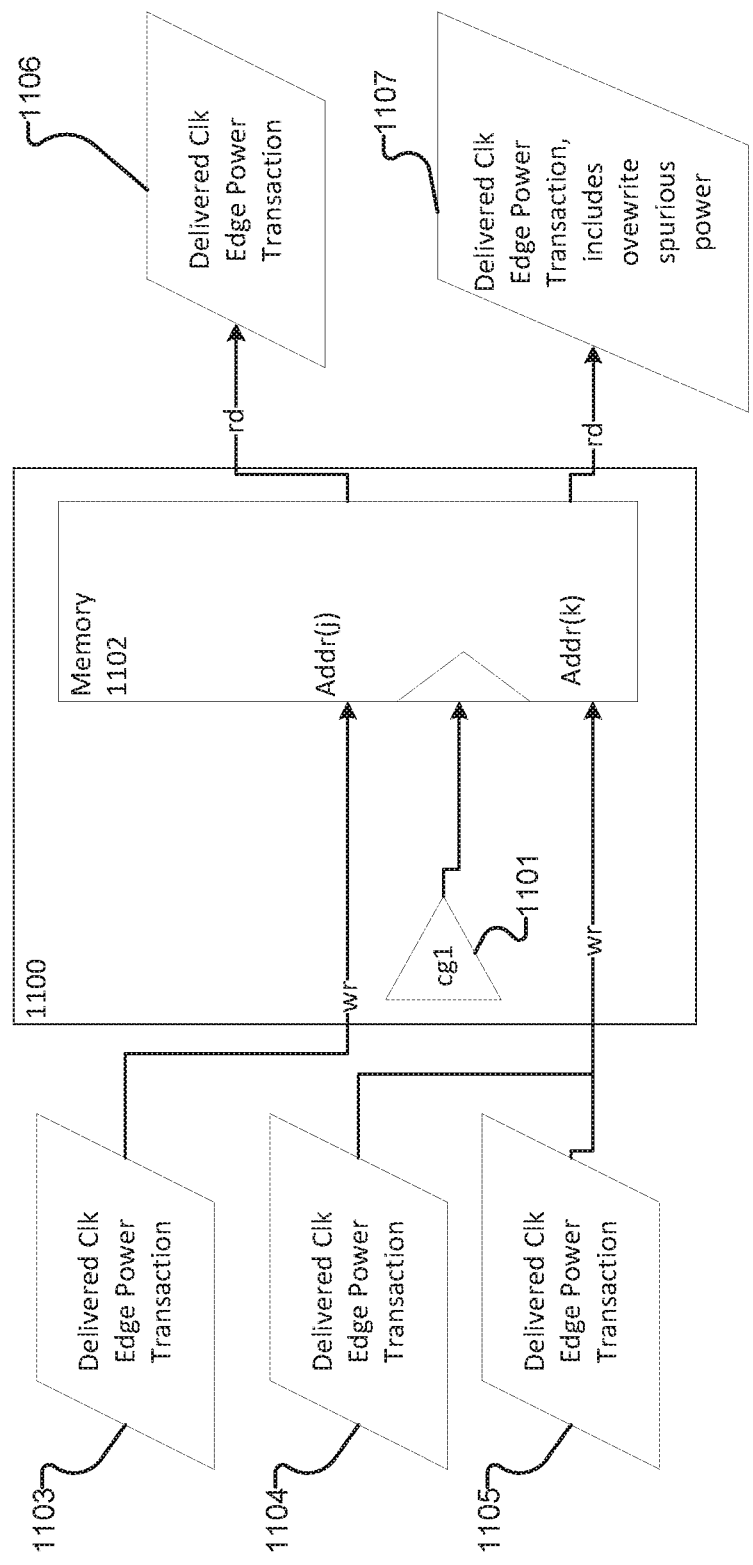
FIG. 11 shows a cell group including a clock gate and a memory according to an embodiment of the present disclosure.

Referring to FIG. 11, an example CG 1100 is shown that includes a clock gate 1101 and a memory 1102. In the example, data associated with power transaction statistics 1103 is written to a first address, Addr(j). Data associated with power transaction statistics 1104 is written to a second address, Addr(k), but is not read before the data is subsequently overwritten by data associated with power transaction statistics 1105. In this case, when the data at Addr(j) is read, the power transaction statistics 1106 associated with the read data is the same as the power transaction statistics 1103 of the written data. However, when data from Addr(k) is read, the power transaction statistics 1107 associated with the read data is the sum of the power transaction statistics 1104 and 1105 associated with the data of the two write operations. This sum is performed to account for the added power consumed by the unnecessary writing of data associated with power transaction statistics 1104.

This power associated data that is overwritten without ever being read may be categorized as an "overwrite", and may be tracked by, for example, an overwrite counter (not shown) that is incremented whenever data overwrites data in a memory that had not been read.

Passing power transaction statistics as described above enables monitors 1010, 1011, 1012 to accrue the total power consumed by the DUT to deliver the data delivered to each CG 1001, 1002, 1003. The monitors 1010, 1011, 1012 update and forward transactions of consumed and categorized power as data flows through the DUT via delivered clock edges.

Figure 12:
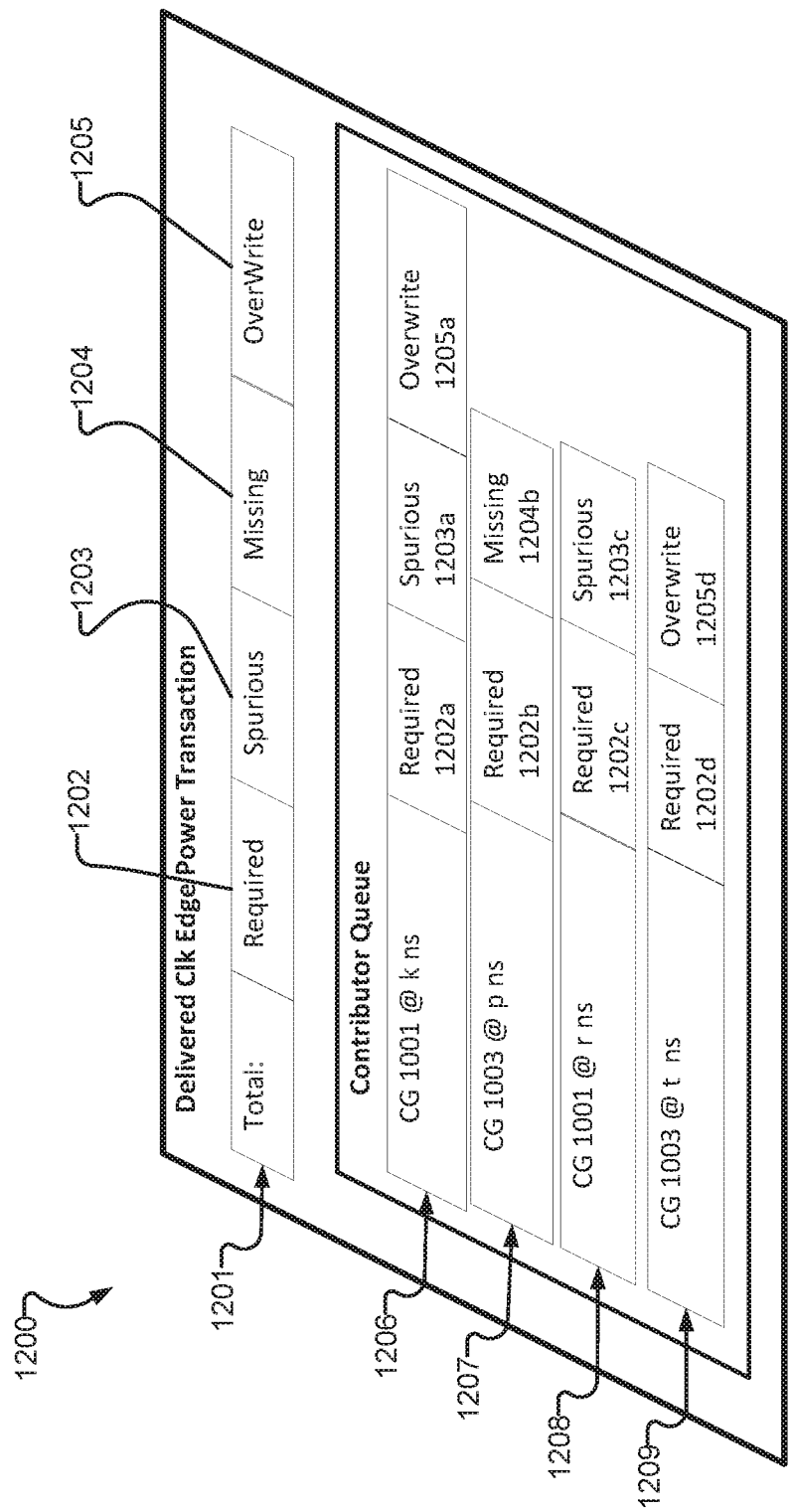
FIG. 12 shows an example of power transaction statistics that may be output by, for example, a monitor shown in FIG. 10B.

FIG. 12 shows an example of power transaction statistics 1200 that may be output by, for example, monitor 1012 shown in FIG. 10B. The power transaction statistics 1200 includes total power 1201 consumed by the DUT for delivering the data through the DUT to be output by CG 1003. The total power 1201 includes counts of required clock edges 1202, which are the active clock edges that are determined to be spurious or overwrite instances, spurious clock edges 1203, missing clock edges 1204, and overwrite instances 1205, which are determined as described above.

In addition to the total power 1201, the power transaction statistics 1200 includes a history of all power contributors of data flowing through the DUT, which includes entries for each CG instance that the data has passed through, time stamps, and power categories. In the example shown in FIG. 12, the data has passed through four CG instances, i.e., each of CG 1001 and CG 1003 twice. Contribution 1206 shows the counts in each power category for the data passing through CG 1003 at time k nanoseconds (ns). Contribution 1206 includes counts of required clock edges 1202a, spurious clock edges 1203a, and overwrite instances 1205a that contribute to the total required 1202 and spurious 1203 clock edges and overwrite instances 1205. Contribution 1206 does not include any contribution to missing clock edges, indicating that no clock edges were missing during this particular transaction. Contribution 1207 shows the counts in each power category for the data passing through CG 1003 at time p ns and includes counts of required clock edges 1202b and missing clock edges 1204b that contribute to the total required 1202 and missing 1204 clock edges, respectively. Contribution 1208 shows the counts in each power category for data passing through CG 1001 at time r ns and includes counts of required clock edges 1202c and spurious clock edges 1203c that are contributed to the total counts of required clock edges 1202 and spurious clock edges 1203. Contribution 1209 shows the counts in each power category for data passing through CG 1003 at time t ns and includes the counts of required clock edges 1202d and overwrite instances 1205d that contribute to the total count of required clock edges 1202 and overwrite instances 1205.

By storing in the power transaction statistics the contributions to the total power for specific CG of the DUT and the time that the data passed through the CG, the location of apparent required and wasted power can be examined at a later time in order to determine power savings that may be implemented.

The examples above include descriptions of ideal clock gating behavior. This is defined by the functional specification of the circuit design. Conventionally, comparing ideal design behavior to actual design behavior is a functional verification exercise. The clock gate monitor embodiments of the present disclosure provide functional power analysis by allowing for comparison of the ideal clock gate behavior with actual clock gate behavior through dynamic, cycle-by-cycle, clock gate power monitoring and processing.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. An apparatus for monitoring operation of a design under test (DUT), the DUT comprising a plurality of combinational logic elements, a plurality of clocked sequential logic elements, and a plurality of clock gate elements connected to selectively provide clock edges to the clocked sequential logic elements, the apparatus comprising:

a plurality of inputs comprising:
an incoming clock edge input connected to detect active clock edges provided to a monitored clock gate of the plurality of clock gate elements of the DUT;
an outgoing clock edge input connected to detect active clock edges sent from the monitored clock gate;
an enable input connected to detect enable signals provided to the monitored clock gate and leaf clock gates of the plurality of clock gate elements of the DUT connected to receive clock edges through the monitored clock gate;
a protocol input connected to receive protocol signals specifying when the monitored clock gate is required to output active clock edges;
an upstream clocking input connected to detect active clock edges output from clock gates controlling sequential logic elements upstream from the sequential logic elements controlled by the monitored clock gate;
a downstream clocking input connected to detect active clock edges output to clock gates controlling sequential logic elements downstream from the sequential logic elements controlled by the monitored clock gate;
a memory in communication with the plurality of inputs for storing values from the plurality of inputs; and a processor in communication with the memory and the plurality of inputs, the processor programmed to:
determine a missing clock edge at the monitored clock gate by comparing the active clock edges sent from the monitored clock gate to a set of required edges specified by the protocol signals, and
determine spurious active clock edges sent from the monitored clock gate by comparing active clock edges output from clock gates controlling sequential logic elements upstream and active clock edges output to clocks gates controlling sequential logic elements downstream; and a clock categorization output arranged to output, to a monitor of the leaf clock gates of the DUT, an indication of the determination of the active clock edges from the monitored clock gate as missing or spurious.

2. The apparatus of claim 1, wherein the plurality of inputs comprises:
- a data-in input connected to detect signals on D-nodes of sequential logic elements within a fanout of the monitored clock gate, the fanout of the monitored clock gate comprising all of the clocked sequential logic elements connected to receive clock signals through the monitored clock gate, and the combinational logic elements that receive data from the clocked sequential logic elements connected to receive clock signals through the monitored clock gate; and
- a data-out input connected to detect signals on Q-nodes of sequential logic elements within the fanout of the monitored clock gate,
- and wherein the processor is further programmed to calculate energy consumed in the fanout of the monitored clock gate.

3. The apparatus of claim 1, wherein the plurality of inputs comprises:
- an upstream clock categorization input to receive from a monitor of a clock gate upstream of the monitored clock gate an indication of the active clock edge output from the upstream clock gate as missing or spurious;
- a downstream clock categorization input to receive from a monitor of a clock gate downstream of the monitored clock gate an indication of the active clock edge output from the downstream clock gate as missing or spurious; and
- wherein the processor is programmed to determine active clock edges sent from the monitored clock gate in a current transaction as either required, missing, or spurious based on the indications received from the upstream clock categorization input and to determine active clock edges sent from the monitored clock gate in a previous transaction as either required, missing, or spurious based on the indications received from the downstream clock categorization input.

4. The apparatus of claim 3, further comprising a power statistics output; and
- wherein the processor is programmed to:
  - define a new transaction as commencing at each detected active clock edge sent from the monitored clock gate; and
  - for each transaction:
    - calculate a power consumed in a fanout of the monitored clock gate in order to pass data through the fanout of the monitored clock gate, the fanout comprising all of the clocked sequential logic elements connected to receive clock signals through the monitored clock gate, and the combinational logic elements that receive data from the clocked sequential logic elements connected to receive clock signals through the monitored clock gate; and
    - output via a power statistics output of the monitor the calculated power consumed by the fanout of the monitored clock gate in order to pass the data through the fanout.

5. The apparatus of claim 4, wherein the inputs comprise a power statistics input; and
- wherein the processor is programmed to receive, from an upstream monitor, statistics of power consumed in order to pass the data through fanouts of clock gates upstream of the monitored clock gate; and
- wherein outputting statistics for the calculated power consumed further includes outputting, for the at least current transaction, a total power consumed by the DUT in order to pass the data through fanouts of clock gates upstream of the monitored clock gate and the fanout of the monitored clock gate.

6. The apparatus of claim 5, wherein outputting the total power includes outputting a contributed power associated with each fanout of clock gates upstream of the monitored clock gate based on the statistics received from the upstream monitor.

7. The apparatus of claim 3, wherein the processor is programmed to determine that the active clock edge sent from the monitored clock gate is spurious when, for any upstream clock gate, a count of spurious clock edges received on the upstream clock categorization input since a previous active clock edge is greater than or equal to the sum of a count of active edges received on the upstream clocking input since the previous active clock edge and a count of missing clock edges received on the upstream clock categorization input since a previous active clock edge.

8. The apparatus of claim 3, wherein the processor is programmed to determine that the active clock edge previously sent from the monitored clock gate is spurious when, for any downstream clock gate, a count of spurious clock edges received on the downstream clock categorization input after sending the active clock edge is greater than or equal to the sum of a count of active edges received on the downstream clocking input after sending the active clock edge and a count of the missing clock edges received on the downstream clock categorization input after sending the active clock edge.

9. The apparatus of claim 1, wherein the plurality of inputs comprises a timing input connected to receive a time window, and wherein the processor is programmed to determine power savings due to dropping of active clock edges at the monitored clock gate for the time window.

10. The apparatus of claim 1, wherein the processor is programmed to attribute energy which would have been consumed by any leaf clock gates connected to receive clock edges through the monitored clock gate as energy saved due to dropping of an active clock edge at the monitored clock gate when the enable input indicates that the leaf clock gates were enabled when the active edge was dropped.

11. A method for monitoring operation of a design under test (DUT), the DUT comprising a plurality of combinational logic elements, a plurality of clocked sequential logic elements, and a plurality of clock gate elements connected to selectively provide clock edges to the clocked sequential logic elements, the method comprising:
- detecting active clock edges provided to a monitored clock gate of the plurality of clock gate elements of the DUT;
- detecting active clock edges sent from the monitored clock gate;
- detecting enable signals provided to the monitored clock gate and leaf clock gates of the plurality of clock gate elements of the DUT connected to receive clock edges through the monitored clock gate;
- receiving protocol signals specifying when the monitored clock gate is required to output active clock edges;
- detecting active clock edges output from clock gates controlling sequential logic elements upstream from the sequential logic elements controlled by the monitored clock gate;
- detecting active clock edges output to clock gates controlling sequential logic elements downstream from the sequential logic elements controlled by the monitored clock gate;

determining missing clock edges by comparing the active clock edges sent from the monitored clock gate to a set of required edges specified by the protocol signals to determine a missing clock edge at the monitored clock gate;

determining spurious active clock edges sent from the monitored clock gate by comparing active clock edges output from clock gates controlling sequential logic elements upstream and active clock edges output to clocks gates controlling sequential logic elements downstream; and outputting to a monitor of the leaf clock gates of the DUT an indication of the determination of the active clock edges output from the monitored clock gate as missing or spurious.

12. The method of claim 11 comprising:

detecting signals on D-nodes of sequential logic elements within a fanout of the monitored clock gate, the fanout of the monitored clock gate comprising all of the clocked sequential logic elements connected to receive clock signals through the monitored clock gate, and the combinational logic elements that receive data from the clocked sequential logic elements connected to receive clock signals through the monitored clock gate;

detecting signals on Q-nodes of sequential logic elements within the fanout of the monitored clock gate; and calculating energy consumed in the fanout of the monitored clock gate based on the detected signals on the D-nodes and Q-nodes.

13. The method of claim 12 comprising calculating energy consumed in the fanout of the monitored clock gate based on a number of sequential logic elements that change signal levels on their Q-nodes.

14. The method of claim 11 comprising determining that a spurious active clock edge is sent from the monitored clock gate when the upstream clocking input indicates that no active clock edge is sent to sequential logic elements upstream from the sequential logic elements controlled by the monitored clock gate.

15. The method of claim 11 comprising: determine that an unnecessary active clock edge is sent from the monitored clock gate when the downstream clocking input indicates that no active clock edge is sent to sequential logic elements downstream from the sequential logic elements controlled by the monitored clock gate.

16. The method of claim 11 comprising:

receiving a time window; and determining power savings due to dropping of active clock edges at the monitored clock gate, power consumed in the fanout of the monitored clock gate, and potential power savings realizable through elimination of the unnecessary active clock edges for the time window.

17. The method of claim 11 comprising:

defining a new transaction as commencing at each detected active clock edge sent from the monitored clock gate; and, for each transaction:

calculating a power consumed in the fanout of the monitored gate in order to pass data associated with the transaction through the fanout of the monitored clock gate, the fanout of the monitored clock gate comprising all of the clocked sequential logic elements connected to receive clock signals through the monitored clock gate, and the combinational logic elements that receive data from the clocked sequential logic elements connected to receive clock signals through the monitored clock gate; and outputting, to a downstream monitor, statistics for at least the power consumed by the fanout in passing the data in a current transaction.

18. The method of claim 17 comprising receiving, from an upstream monitor, statistics of the power consumed in the DUT in order to pass the data through fanouts of clock gates upstream of the monitored clock gate; and wherein outputting statistics for the power further includes outputting, for the at least current transaction, a total power consumed by the DUT in order to pass the data through fanouts of clock gates upstream of the monitored clock gate and the fanout of the monitored clock gate.

19. The method of claim 18, wherein outputting the total power includes outputting a contributed power associated with each fanout of clock gates upstream of the monitored clock gate based on statistics received from the upstream monitor.

20. The method of claim 17, further comprising:

determining that data written to a memory of the fanout of the monitored gate clock in a previous transaction was not read before being overwritten in a subsequent transaction; and wherein outputting statistics for at least the power consumed by the fanout in passing the data comprises outputting an overwrite statistic indicating the power consumed by writing the data to the memory.

* * * * *